US012280513B2

(12) United States Patent
Broemse et al.

(10) Patent No.: US 12,280,513 B2
(45) Date of Patent: Apr. 22, 2025

(54) SHAVING RAZOR SYSTEM

(71) Applicant: The Gillette Company LLC, Boston, MA (US)

(72) Inventors: Norbert Broemse, Bad Homburg (DE); Klaus Heubach, Koenigstein (DE); Maurice Schirmer, Schwalbach am Taunus (DE); Jannik Loeper, Hattersheim (DE)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 17/568,942

(22) Filed: Jan. 5, 2022

(65) Prior Publication Data

US 2022/0126470 A1 Apr. 28, 2022

Related U.S. Application Data

(62) Division of application No. 16/367,338, filed on Mar. 28, 2019, now Pat. No. 11,247,356.

(60) Provisional application No. 62/650,386, filed on Mar. 30, 2018.

(51) Int. Cl.

| | |
|---|---|
| ***B26B 21/48*** | (2006.01) |
| ***B26B 21/22*** | (2006.01) |
| ***B26B 21/40*** | (2006.01) |
| ***B26B 21/52*** | (2006.01) |

(52) U.S. Cl.

CPC ............ *B26B 21/48* (2013.01); *B26B 21/225* (2013.01); *B26B 21/4012* (2013.01); *B26B 21/405* (2013.01); *B26B 21/526* (2013.01)

(58) Field of Classification Search

CPC ... B26B 19/388; B26B 21/4056; B26B 21/40; B26B 21/44; B26B 19/3806; B26B 21/48; B26B 21/225; B26B 21/4012; B26B 21/405; B26B 21/526

See application file for complete search history.

(56) References Cited

U.S. PATENT DOCUMENTS

| | | | |
|---|---|---|---|
| 1,505,578 | A | 8/1924 | Charles |
| 1,552,026 | A | 9/1925 | Charles |
| 1,675,128 | A | 6/1928 | Harry |
| 1,821,574 | A | 9/1931 | Nicholas |
| 1,892,836 | A | 1/1933 | Harvey |

(Continued)

FOREIGN PATENT DOCUMENTS

| | | | |
|---|---|---|---|
| AU | 1135700 | A | 11/2000 |
| CA | 2261421 | A1 | 10/1999 |

(Continued)

OTHER PUBLICATIONS

"Practical Design Guidelines for Flex," Feb. 27, 2027, pp. 75-116, available on Sep. 12, 2023 at : https://fliphtml5.com/izxs/irex/basic (Year: 2016).*

(Continued)

*Primary Examiner* — Jonathan G Riley
(74) *Attorney, Agent, or Firm* — John M. Lipchitz

(57) ABSTRACT

A method of manufacturing a shaving razor. A circuit board is positioned within a handle. A first end of a flexible electrical bridge is connected to the circuit board. A second end of the flexible electrical bridge is connected to an energy emitting device. A loop is formed in the flexible electrical bridge by bending the flexible electrical bridge.

14 Claims, 11 Drawing Sheets

(56) References Cited

U.S. PATENT DOCUMENTS

| | | | |
|---|---|---|---|
| 2,018,147 A | 10/1935 | Emil | |
| 2,063,808 A | 12/1936 | Henderson et al. | |
| 2,134,973 A | 11/1938 | Harwell | |
| 2,164,581 A | 7/1939 | Ewald | |
| 2,225,257 A | 12/1940 | Conill | |
| 2,231,219 A | 2/1941 | Payson | |
| 2,324,148 A | 7/1943 | Gravin | |
| 2,327,192 A | 8/1943 | Keene | |
| 2,414,482 A | 1/1947 | Kelso | |
| 2,536,844 A | 1/1951 | Carlton et al. | |
| 2,622,319 A | 12/1952 | Russell | |
| 2,714,651 A | 8/1955 | Richard | |
| 3,325,627 A | 6/1967 | Adler et al. | |
| 3,364,568 A | 1/1968 | Nathaniel | |
| 3,454,745 A | 7/1969 | Stone | |
| 3,591,923 A | 7/1971 | Rose | |
| 3,593,416 A * | 7/1971 | Edson | B26B 21/14 30/67 |
| 3,600,804 A | 8/1971 | Brown | |
| 3,611,568 A | 10/1971 | Alexander et al. | |
| 3,644,992 A | 2/1972 | Bennett et al. | |
| 3,648,368 A | 3/1972 | Douglass et al. | |
| 3,713,184 A | 1/1973 | Leland | |
| 3,748,730 A | 7/1973 | Bartram et al. | |
| 3,768,162 A | 10/1973 | Perry | |
| 3,786,563 A | 1/1974 | Dorion et al. | |
| 3,795,979 A | 3/1974 | Perry | |
| 3,876,858 A | 4/1975 | Davis et al. | |
| 3,878,605 A | 4/1975 | Braginetz | |
| 3,896,364 A | 7/1975 | Reister | |
| 3,934,115 A | 1/1976 | Peterson | |
| 3,935,639 A | 2/1976 | Terry et al. | |
| 3,950,848 A | 4/1976 | Goldstein | |
| 4,026,016 A | 5/1977 | Nissen | |
| 4,077,119 A | 3/1978 | Sellera | |
| 4,083,104 A | 4/1978 | Nissen et al. | |
| 4,094,063 A | 6/1978 | Trotta | |
| 4,148,236 A | 4/1979 | Holoyen et al. | |
| 4,253,013 A | 2/1981 | Mabuchi | |
| 4,253,235 A | 3/1981 | Jacobson | |
| 4,258,471 A | 3/1981 | Jacobson | |
| 4,266,340 A | 5/1981 | Bowman | |
| 4,281,455 A | 8/1981 | Dixon et al. | |
| 4,281,456 A | 8/1981 | Douglass et al. | |
| 4,377,034 A | 3/1983 | Druash et al. | |
| 4,403,414 A | 9/1983 | Kiraly et al. | |
| 4,413,411 A | 11/1983 | Trotta | |
| 4,422,237 A | 12/1983 | Trotta | |
| 4,475,286 A | 10/1984 | Saito | |
| 4,502,216 A | 3/1985 | Furnari | |
| 4,514,904 A | 5/1985 | Bond | |
| 4,561,526 A | 12/1985 | Winter et al. | |
| 4,562,644 A | 1/1986 | Hitchens | |
| 4,587,968 A | 5/1986 | Price | |
| 4,598,192 A | 7/1986 | Garrett | |
| 4,658,505 A | 4/1987 | Williams | |
| 4,716,652 A | 1/1988 | Cataudella | |
| 4,791,724 A | 12/1988 | Dumas | |
| 4,797,998 A | 1/1989 | Motta | |
| 4,809,432 A | 3/1989 | Schauble | |
| 4,833,779 A | 5/1989 | Iten | |
| 4,837,930 A | 6/1989 | Righi | |
| 4,864,735 A | 9/1989 | Chung | |
| 4,879,811 A | 11/1989 | Cooney | |
| 4,888,868 A | 12/1989 | Pritchard | |
| 4,918,818 A | 4/1990 | Hsieh | |
| 4,944,090 A | 7/1990 | Sumnall | |
| 4,970,784 A | 11/1990 | Althaus et al. | |
| 4,985,995 A | 1/1991 | Coffin | |
| 5,010,905 A | 4/1991 | Snyder et al. | |
| 5,016,352 A | 5/1991 | Metcalf | |
| 5,029,391 A | 7/1991 | Althaus et al. | |
| 5,031,319 A | 7/1991 | Althaus et al. | |
| 5,033,152 A | 7/1991 | Althaus | |
| 5,038,472 A | 8/1991 | Iderosa | |
| 5,044,077 A | 9/1991 | Ferraro et al. | |
| 5,046,249 A | 9/1991 | Kawara et al. | |
| 5,065,515 A | 11/1991 | Iderosa | |
| 5,092,041 A | 3/1992 | Podolsky | |
| 5,093,991 A | 3/1992 | Hendrickson | |
| 5,098,414 A | 3/1992 | Walker | |
| 5,113,585 A | 5/1992 | Rogers | |
| 5,121,541 A | 6/1992 | Patrakis | |
| 5,157,834 A | 10/1992 | Chen et al. | |
| 5,168,628 A | 12/1992 | Mock et al. | |
| 5,182,858 A | 2/1993 | Chen | |
| 5,191,172 A | 3/1993 | Garganese | |
| 5,191,712 A | 3/1993 | Crook et al. | |
| 5,270,493 A | 12/1993 | Inobe et al. | |
| 5,299,354 A | 4/1994 | Metcalf et al. | |
| 5,307,564 A | 5/1994 | Schoenberg | |
| 5,309,640 A | 5/1994 | Caron | |
| 5,319,822 A | 6/1994 | Shaw | |
| 5,331,740 A | 7/1994 | Carson, III et al. | |
| 5,333,382 A | 8/1994 | Buchbinder | |
| 5,333,383 A | 8/1994 | Ferraro | |
| 5,337,478 A | 8/1994 | Cohen et al. | |
| 5,347,717 A | 9/1994 | Ts | |
| 5,394,777 A | 3/1995 | Kozikowski | |
| 5,402,573 A | 4/1995 | Laniado | |
| 5,438,759 A | 8/1995 | Dieringer | |
| 5,454,164 A | 10/1995 | Yin et al. | |
| 5,497,551 A | 3/1996 | Apprille, Jr. | |
| 5,533,263 A | 7/1996 | Gilder | |
| 5,560,106 A | 10/1996 | Armbruster et al. | |
| 5,575,068 A | 11/1996 | Pedersen | |
| 5,600,887 A | 2/1997 | Olson | |
| 5,626,154 A | 5/1997 | Rogers et al. | |
| 5,636,442 A | 6/1997 | Wain | |
| 5,653,025 A | 8/1997 | Cheng et al. | |
| 5,661,907 A | 9/1997 | Apprille, Jr. | |
| 5,673,485 A | 10/1997 | Hill | |
| 5,687,485 A | 11/1997 | Shurtleff et al. | |
| 5,743,017 A | 4/1998 | Dreher et al. | |
| 5,761,814 A | 6/1998 | Anderson et al. | |
| 5,780,819 A | 7/1998 | Fabrikant et al. | |
| 5,782,346 A | 7/1998 | Gray et al. | |
| 5,784,790 A | 7/1998 | Carson, III et al. | |
| 5,786,573 A | 7/1998 | Fabrikant et al. | |
| 5,787,586 A | 8/1998 | Apprille, Jr. et al. | |
| 5,787,593 A | 8/1998 | Althaus | |
| 5,787,594 A | 8/1998 | Estrada | |
| 5,794,342 A | 8/1998 | Davey | |
| 5,794,343 A | 8/1998 | Lee et al. | |
| 5,822,869 A | 10/1998 | Metcalf et al. | |
| 5,911,480 A | 6/1999 | Morgan | |
| 5,933,960 A | 8/1999 | Avidor | |
| 5,953,824 A | 9/1999 | Ferraro et al. | |
| 5,953,825 A | 9/1999 | Christman et al. | |
| 5,956,851 A | 9/1999 | Apprille, Jr. et al. | |
| 6,026,577 A | 2/2000 | Ferraro | |
| 6,035,537 A | 3/2000 | Apprille, Jr. et al. | |
| 6,052,903 A | 4/2000 | Metcalf et al. | |
| 6,061,912 A | 5/2000 | Gazaway | |
| 6,115,924 A | 9/2000 | Oldroyd | |
| 6,122,826 A | 9/2000 | Coffin et al. | |
| 6,138,361 A | 10/2000 | Richard et al. | |
| 6,141,875 A | 11/2000 | Andrews | |
| 6,158,125 A | 12/2000 | Dolev | |
| 6,161,287 A | 12/2000 | Swanson et al. | |
| 6,161,288 A | 12/2000 | Andrews | |
| 6,189,222 B1 | 2/2001 | Doyle | |
| D446,884 S | 8/2001 | Kohring et al. | |
| 6,276,061 B1 | 8/2001 | Rozenkranc | |
| 6,276,062 B1 | 8/2001 | Prochaska | |
| 6,301,792 B1 | 10/2001 | Speer | |
| 6,308,415 B1 | 10/2001 | Sablatschan et al. | |
| 6,311,400 B1 * | 11/2001 | Hawes | B26B 21/225 30/527 |
| 6,421,918 B1 | 7/2002 | Dato et al. | |
| 6,430,813 B2 | 8/2002 | Muraguchi et al. | |
| 6,434,839 B1 | 8/2002 | Lee et al. | |
| 6,442,850 B1 | 9/2002 | Coffin | |
| 6,481,104 B1 | 11/2002 | Parker et al. | |

(56) References Cited

U.S. PATENT DOCUMENTS 6,526,660 B1 3/2003 Macneil
6,574,866 B2 6/2003 Pragt et al.
6,598,303 B2 7/2003 Bosy et al.
6,615,498 B1 9/2003 King et al.
6,655,028 B2 12/2003 Coffin
6,675,479 B1 1/2004 Walker, Jr. et al.
6,736,997 B2 5/2004 Olding et al.
6,754,958 B2 6/2004 Haws et al.
6,763,590 B2 7/2004 Guimont et al.
6,789,321 B2 9/2004 Simms
6,807,739 B2 10/2004 Follo
6,817,101 B1 11/2004 Bohmer
6,836,966 B2 * 1/2005 Patrick .................. B26B 19/382 30/140
6,868,610 B2 3/2005 Brandt et al.
6,880,253 B1 * 4/2005 Gyllerstrom .......... B26B 21/222 30/527
6,910,274 B1 6/2005 Pennella et al.
6,941,659 B2 9/2005 Gilder
6,946,624 B1 9/2005 Tomassetti
6,966,400 B1 11/2005 Rollins et al.
6,973,730 B2 12/2005 Tomassetti et al.
7,000,282 B2 2/2006 Cox et al.
D524,482 S 7/2006 Fischer
D524,483 S 7/2006 Bunnell et al.
7,093,363 B1 8/2006 Kuo
7,111,400 B2 9/2006 Guimont et al.
7,137,203 B2 11/2006 Bressler et al.
D533,684 S 12/2006 Gray
7,168,173 B2 * 1/2007 Worrick, III ........ B26B 21/4031 30/527
7,197,825 B2 4/2007 Walker et al.
7,200,938 B2 4/2007 Lembke
7,219,430 B2 5/2007 Fandrey et al.
7,520,408 B1 4/2009 Smith et al.
7,681,320 B2 * 3/2010 Szczepanowski ...... B26B 21/48 30/44
7,743,506 B2 * 6/2010 Szczepanowski .... B26B 21/446 219/520
7,770,294 B2 8/2010 Bruno et al.
7,877,879 B2 2/2011 Nakasuka
7,913,399 B2 3/2011 Lau
D643,977 S 8/2011 Wonderley et al.
8,015,711 B2 9/2011 Psimadas et al.
8,033,023 B2 10/2011 Johnson et al.
8,104,184 B2 1/2012 Walker
8,183,940 B2 5/2012 Koyama et al.
8,186,063 B2 5/2012 Clarke
8,191,263 B2 6/2012 Follo et al.
8,205,344 B2 6/2012 Stevens
8,429,826 B2 4/2013 Clarke
8,434,189 B2 5/2013 Wang
8,438,735 B2 5/2013 De Klerk
8,474,144 B2 7/2013 Royle
8,479,624 B2 7/2013 Flyash et al.
8,481,898 B2 7/2013 Parker
8,510,958 B2 8/2013 Hart et al.
8,516,706 B2 8/2013 Flyash et al.
8,615,886 B1 12/2013 Childers
8,615,891 B2 12/2013 Psimadas et al.
8,621,758 B2 1/2014 Quintiliani et al.
8,650,763 B2 2/2014 Howell et al.
8,661,688 B2 3/2014 Shigeta et al.
8,713,801 B2 5/2014 Bohmer et al.
8,732,955 B2 5/2014 Howell et al.
D707,885 S 6/2014 Cataudella
8,745,877 B2 6/2014 Szczepanowski
8,745,883 B2 6/2014 Murgida et al.
8,769,825 B2 7/2014 Howell et al.
8,772,679 B2 7/2014 Novikov
8,793,879 B2 8/2014 Jessemey et al.
8,826,543 B2 9/2014 Szczepanowski et al.
8,887,369 B2 11/2014 Burrowes et al.
8,938,885 B2 1/2015 Stevens
8,978,258 B2 3/2015 Patel et al.
9,071,073 B2 6/2015 Bourilkov et al.
D741,008 S 10/2015 Bruno et al.
D741,010 S 10/2015 Wang et al.
9,149,945 B2 * 10/2015 Tomassetti .............. B26B 21/48
9,193,077 B2 11/2015 Worrick
D749,265 S 2/2016 Cataudella
9,259,846 B1 2/2016 Robertson
9,283,685 B2 3/2016 Griffin et al.
9,381,657 B2 7/2016 Xu et al.
D764,101 S 8/2016 Cataudella
9,434,080 B2 9/2016 Bozikis
9,440,367 B2 9/2016 Zakuskin
9,469,038 B2 10/2016 Iaccarino et al.
9,469,039 B2 10/2016 Hodgson et al.
9,475,202 B2 10/2016 Griffin et al.
D772,484 S 11/2016 Otsuka
9,486,930 B2 11/2016 Provost et al.
9,498,892 B2 11/2016 Nakasuka et al.
9,511,501 B2 12/2016 Carneiro et al.
9,517,570 B2 12/2016 Tucker et al.
9,539,734 B1 1/2017 Bozikis et al.
9,545,729 B2 1/2017 Buck, Jr. et al.
9,604,375 B2 * 3/2017 Bohmer .................. B26B 21/48
D785,248 S 4/2017 Bruno et al.
9,623,575 B2 4/2017 Griffin et al.
9,630,331 B2 * 4/2017 Griffin .................. B26B 21/225
9,636,830 B2 5/2017 Hodgson et al.
9,669,555 B2 6/2017 Griffin et al.
9,694,503 B2 7/2017 Papadopoulos-papageorgis et al.
9,707,690 B2 7/2017 Hodgson
9,751,229 B2 9/2017 Hodgson
9,789,620 B2 10/2017 Wain et al.
9,833,917 B2 12/2017 Hodgson et al.
9,868,220 B2 1/2018 Moffat
D811,658 S 2/2018 Cataudella et al.
9,889,572 B2 2/2018 Bucco
9,902,077 B2 2/2018 Park et al.
9,975,262 B2 5/2018 Safar
9,993,931 B1 6/2018 Zucker
D829,991 S 10/2018 Zucker
10,099,393 B2 10/2018 Gester
10,137,584 B2 11/2018 Lee et al.
D843,059 S 3/2019 Lettenberger
10,220,532 B2 3/2019 Davos et al.
10,328,587 B2 6/2019 Griffin et al.
10,406,704 B2 9/2019 Barrett et al.
10,427,312 B2 10/2019 Gratsias et al.
D867,661 S 11/2019 Ovvadias
10,500,747 B2 12/2019 Tucker et al.
D874,061 S 1/2020 Verasamy et al.
10,538,006 B2 1/2020 Bridges et al.
10,543,611 B2 1/2020 Bozikis et al.
D877,983 S 3/2020 Walker, Jr. et al.
10,583,576 B2 3/2020 Broemse et al.
10,652,956 B2 5/2020 Heubach et al.
10,667,892 B2 6/2020 Bärtschi et al.
10,759,069 B2 9/2020 Johnson et al.
10,766,155 B2 9/2020 Broemse
10,773,403 B2 9/2020 Washington et al.
10,773,406 B2 9/2020 Broemse
10,773,407 B2 9/2020 Washington et al.
10,773,408 B2 9/2020 Johnson et al.
10,786,917 B1 9/2020 Walton
10,843,357 B2 11/2020 Jang
D905,339 S 12/2020 Roche
10,850,412 B2 12/2020 Harris, II
10,864,646 B2 12/2020 Long et al.
D908,285 S 1/2021 Cataudella et al.
10,894,330 B2 1/2021 Goeder et al.
D912,326 S 3/2021 Goeder et al.
D913,591 S 3/2021 Ramm et al.
10,940,597 B2 3/2021 Park et al.
10,946,540 B2 3/2021 Bozikis et al.
10,974,403 B2 4/2021 Chang
D921,984 S 6/2021 Brissett et al.
11,117,278 B2 9/2021 Walker, Jr.
D933,295 S 10/2021 Washington et al.
11,148,310 B2 10/2021 Maimone et al.

(56) References Cited

U.S. PATENT DOCUMENTS 11,154,999 B2 10/2021 Johnson et al.
D936,287 S 11/2021 Huang et al.
11,325,270 B2 5/2022 Griffin et al.
11,358,294 B2 6/2022 Johnson et al.
D961,847 S 8/2022 Walker, Jr. et al.
D961,849 S 8/2022 Brissett et al.
D965,221 S 9/2022 Verasamy et al.
D965,887 S 10/2022 Lettenberger et al.
D967,529 S 10/2022 Goeder et al.
D972,776 S 12/2022 Lin
11,826,924 B2 11/2023 Washington
2001/0003869 A1 6/2001 Rocha
2001/0023538 A1 9/2001 Muraguchi et al.
2002/0000040 A1 1/2002 Gilder
2002/0014010 A1 2/2002 Beutel et al.
2002/0023351 A1 2/2002 Simms
2002/0029478 A1 3/2002 Haws et al.
2002/0035786 A1 3/2002 Gilder et al.
2002/0096512 A1 7/2002 Abbott et al.
2002/0116822 A1 8/2002 Coffin
2002/0120278 A1 8/2002 Cense et al.
2002/0138992 A1 10/2002 Richard
2002/0144404 A1 10/2002 Gilder et al.
2002/0189102 A1 12/2002 Orloff
2003/0046816 A1 3/2003 Kanzer
2003/0070309 A1 4/2003 Brown et al.
2003/0074798 A1 4/2003 Follo
2003/0079348 A1 5/2003 Follo
2003/0088984 A1 5/2003 Brandt et al.
2003/0101589 A1 6/2003 Barish
2003/0115762 A1 6/2003 Follo et al.
2003/0154832 A1 8/2003 Guimont et al.
2003/0155887 A1 8/2003 Bourilkov et al.
2003/0204954 A1 11/2003 Wain
2003/0226258 A1 12/2003 Patrick
2003/0231001 A1 12/2003 Bruning
2004/0045948 A1 3/2004 Shalev et al.
2004/0074097 A1 4/2004 Guimont et al.
2004/0098863 A1 5/2004 Shalev et al.
2004/0181953 A1 9/2004 Follo et al.
2004/0216311 A1 11/2004 Follo
2004/0226126 A1 11/2004 Cox et al.
2005/0000100 A1 1/2005 Coffin
2005/0189338 A1 9/2005 Sukeforth
2005/0198840 A1 9/2005 Worrick, III et al.
2005/0198841 A1 9/2005 Worrick, III
2005/0218513 A1 10/2005 Seko
2005/0223568 A1 10/2005 Walker et al.
2005/0268472 A1 12/2005 Bourilkov et al.
2006/0026841 A1 2/2006 Freund
2006/0032053 A1* 2/2006 Saker .................. B26B 21/4081
30/34.05
2006/0032054 A1* 2/2006 Simms .................... B26B 21/38
30/34.05
2006/0032055 A1* 2/2006 Simms .................. B26B 21/405
30/34.05
2006/0037197 A1* 2/2006 Hawes .................... B26B 21/44
30/45
2006/0070242 A1* 4/2006 Szczepanowski ...... B26B 21/48
30/140
2006/0080837 A1 4/2006 Johnson et al.
2006/0080838 A1 4/2006 Johnson et al.
2006/0080839 A1 4/2006 Hesketh
2006/0112563 A1 6/2006 Wain
2006/0117568 A1 6/2006 Tomassetti
2006/0123631 A1 6/2006 Szczepanowski et al.
2006/0138121 A1 6/2006 Werkman et al.
2006/0179661 A1 8/2006 Walker et al.
2006/0260142 A1 11/2006 Dombrowski et al.
2007/0028449 A1 2/2007 King
2007/0044313 A1* 3/2007 Rozenkranc ........ B26B 19/3873
30/44
2007/0056167 A1 3/2007 Richard et al.
2007/0068010 A1 3/2007 Annoura
2007/0084058 A1 4/2007 Szczepanowski
2007/0145031 A1 6/2007 Shalev et al.
2007/0163123 A1 7/2007 Gratsias et al.
2007/0168302 A1 7/2007 Giovinazzo et al.
2007/0169302 A1 7/2007 Madhala
2007/0180699 A1 8/2007 Psimadas et al.
2007/0220752 A1 9/2007 Psimadas et al.
2007/0256276 A1 11/2007 Holland-letz
2007/0271714 A1 11/2007 Adam et al.
2007/0283565 A1 12/2007 Ho
2008/0016692 A1 1/2008 Noble
2008/0034591 A1 2/2008 Fung
2008/0086887 A1 4/2008 Park et al.
2008/0148579 A1 6/2008 Bozikis et al.
2008/0155831 A1 7/2008 Royle
2008/0189953 A1 8/2008 Jessemey et al.
2008/0271319 A1 11/2008 Saker et al.
2008/0289185 A1 11/2008 Clarke
2008/0307660 A1 12/2008 Clarke
2009/0007432 A1 1/2009 Chou
2009/0056140 A1 3/2009 Bruno et al.
2009/0070947 A1 3/2009 Baertschi et al.
2009/0071010 A1 3/2009 Hart
2009/0083982 A1 4/2009 Forsdike
2009/0119923 A1 5/2009 Hart et al.
2009/0178281 A1 7/2009 Moore
2009/0183371 A1 7/2009 Mileti et al.
2009/0217531 A1 9/2009 Muraguchi
2009/0235539 A1 9/2009 Wonderley
2009/0255123 A1 10/2009 Tomassetti et al.
2009/0293281 A1 12/2009 Bruno
2009/0313837 A1 12/2009 Winter et al.
2010/0000093 A1 1/2010 Hwang
2010/0024615 A1 2/2010 Rebaudieres et al.
2010/0031510 A1 2/2010 Gester et al.
2010/0043242 A1 2/2010 Stevens
2010/0077622 A1 4/2010 Schulz
2010/0095530 A1 4/2010 De Klerk et al.
2010/0107416 A1 5/2010 Follo
2010/0115774 A1 5/2010 De Klerk
2010/0122464 A1 5/2010 Ndou et al.
2010/0132204 A1 6/2010 Brown
2010/0198134 A1 8/2010 Eckhouse et al.
2010/0205808 A1* 8/2010 King ..................... B26B 21/528
30/34.2
2010/0212939 A1 8/2010 Ito et al.
2010/0236071 A1 9/2010 Szczepanowski et al.
2010/0236072 A1 9/2010 Szczepanowski
2010/0269352 A1 10/2010 Curtin
2010/0281698 A1 11/2010 King
2010/0287784 A1 11/2010 Qiu
2010/0292546 A1 11/2010 Gonopolskiy et al.
2010/0319204 A1 12/2010 Peterson et al.
2011/0005082 A1 1/2011 Larscheid et al.
2011/0016721 A1 1/2011 Schnak et al.
2011/0023310 A1 2/2011 Psimadas et al.
2011/0035950 A1 2/2011 Royle
2011/0041340 A1 2/2011 Sherman et al.
2011/0088269 A1 4/2011 Walker, Jr. et al.
2011/0126413 A1 6/2011 Szczepanowski et al.
2011/0138637 A1 6/2011 Bucco
2011/0146015 A1 6/2011 Moskovich et al.
2011/0146080 A1 6/2011 Pauw
2011/0167640 A1 7/2011 Flyash et al.
2011/0167653 A1 7/2011 Psimadas et al.
2011/0174328 A1 7/2011 Cerutti et al.
2011/0197450 A1 8/2011 Taub et al.
2011/0203124 A1 8/2011 Bridges et al.
2011/0219624 A1 9/2011 Rockell et al.
2011/0239475 A1 10/2011 Efthimiadis et al.
2011/0252646 A1 10/2011 Gordon et al.
2011/0289776 A1 12/2011 Hawes et al.
2011/0308089 A1 12/2011 Bridges
2011/0314677 A1 12/2011 Meier et al.
2012/0030945 A1 2/2012 Clarke et al.
2012/0060382 A1 3/2012 Beugels et al.
2012/0096718 A1 4/2012 Howell
2012/0102745 A1 5/2012 Jessemey et al.
2012/0102761 A1 5/2012 Jessemey et al.

(56) References Cited

U.S. PATENT DOCUMENTS

2012/0124840 A1 5/2012 Iaccarino
2012/0125489 A1 5/2012 Hashimura et al.
2012/0151775 A1 6/2012 Ren
2012/0167392 A1 7/2012 Cherian et al.
2012/0187261 A1 7/2012 Cicero
2012/0205362 A1 8/2012 Etzkorn et al.
2012/0210586 A1 8/2012 Lelieveld et al.
2012/0227554 A1 9/2012 Beech
2012/0233864 A1 9/2012 Flyash et al.
2012/0234658 A1 9/2012 Schnak et al.
2012/0246947 A1 10/2012 Fang et al.
2012/0255185 A1 10/2012 Patel et al.
2012/0255942 A1 10/2012 Vodvarka
2012/0260509 A1 10/2012 Fang et al.
2012/0266465 A1 10/2012 Hart et al.
2012/0279070 A1 11/2012 Seo
2012/0279073 A1 11/2012 Snow et al.
2012/0279075 A1 11/2012 Amsel
2012/0291288 A1* 11/2012 Bohmer .................. B26B 21/48 30/34.05
2012/0291295 A1 11/2012 Braun
2012/0297625 A1 11/2012 Madden
2012/0311865 A1 12/2012 Hamilton et al.
2012/0330234 A1 12/2012 Balluff et al.
2013/0081276 A1 4/2013 Wain et al.
2013/0081289 A1* 4/2013 Wain ....................... B26B 21/52 30/527
2013/0081290 A1 4/2013 Murgida et al.
2013/0097868 A1 4/2013 Jessemey et al.
2013/0144280 A1 6/2013 Eckhouse et al.
2013/0145623 A1 6/2013 Wain
2013/0145624 A1 6/2013 Jessemey et al.
2013/0145625 A1 6/2013 Xu et al.
2013/0145626 A1 6/2013 Xu et al.
2013/0160306 A1 6/2013 Howell et al.
2013/0199346 A1 8/2013 Psimadas et al.
2013/0199348 A1 8/2013 Aberizk
2013/0205959 A1 8/2013 Jones et al.
2013/0247395 A1 9/2013 Szczepanowski et al.
2013/0291390 A1 11/2013 Gajria et al.
2013/0291391 A1 11/2013 Stevens
2013/0312272 A1 11/2013 Wilson et al.
2013/0326881 A1 12/2013 Blatter
2014/0026423 A1 1/2014 Schnak et al.
2014/0026726 A1 1/2014 Griffin et al.
2014/0048310 A1 2/2014 Montevirgen et al.
2014/0083265 A1 3/2014 Provost et al.
2014/0096396 A1 4/2014 Pauw
2014/0096402 A1 4/2014 Nakasuka et al.
2014/0109735 A1 4/2014 Shepperson
2014/0114301 A1 4/2014 Solomon et al.
2014/0116211 A1 5/2014 Griffin et al.
2014/0116737 A1 5/2014 Iwata et al.
2014/0165800 A1 6/2014 Griffin et al.
2014/0216210 A1 8/2014 Near
2014/0230258 A1 8/2014 Eagleton et al.
2014/0245611 A1 9/2014 Bohmer et al.
2015/0032128 A1* 1/2015 Tavlin ...................... A61N 7/02 606/131
2015/0068043 A1 3/2015 Gester et al.
2015/0122899 A1 5/2015 Kaneko et al.
2015/0135538 A1 5/2015 Tomassetti et al.
2015/0174773 A1 6/2015 Hodgson
2015/0174774 A1 6/2015 Hodgson
2015/0174775 A1 6/2015 Hodgson
2015/0174776 A1 6/2015 Hawes
2015/0190935 A1 7/2015 Griffin et al.
2015/0190936 A1 7/2015 Griffin et al.
2015/0197018 A1* 7/2015 Heubach ................. B26B 21/48 30/34.05
2015/0197019 A1 7/2015 Hodgson et al.
2015/0197020 A1 7/2015 Hodgson et al.
2015/0197021 A1 7/2015 Hodgson et al.
2015/0266190 A1 9/2015 Bohmer et al.
2015/0266191 A1 9/2015 Maimone et al.
2015/0273708 A1 10/2015 Haba
2015/0283716 A1 10/2015 Kim et al.
2015/0290819 A1 10/2015 Giannopoulos et al.
2015/0296622 A1 10/2015 Jiang et al.
2015/0298326 A1* 10/2015 Tomassetti .............. B26B 21/48 30/34.05
2015/0298327 A1 10/2015 Tomassetti et al.
2015/0306777 A1 10/2015 Georgakis et al.
2015/0314466 A1 11/2015 Papadopoulos-papageorgis et al.
2015/0321366 A1 11/2015 Papadopoulos-papageorgis et al.
2015/0328788 A1 11/2015 Ren et al.
2016/0001455 A1 1/2016 Swenson
2016/0046028 A1 2/2016 Meier et al.
2016/0046029 A1 2/2016 Samuels et al.
2016/0096280 A1 4/2016 Robertson
2016/0101531 A1 4/2016 Bunnell
2016/0107324 A1 4/2016 Robertson et al.
2016/0121495 A1 5/2016 Johnson
2016/0121496 A1 5/2016 Johnson
2016/0121497 A1* 5/2016 Johnson ................ B26B 21/521 30/532
2016/0144519 A1 5/2016 Hahn et al.
2016/0144520 A1 5/2016 Lee
2016/0250764 A1 9/2016 Hashimoto
2016/0250765 A1 9/2016 Gratsias et al.
2016/0250766 A1 9/2016 Gratsias et al.
2016/0288348 A1 10/2016 Molema et al.
2016/0375596 A1 12/2016 Broemse et al.
2016/0375597 A1 12/2016 Broemse
2017/0001323 A1 1/2017 Furuta
2017/0021513 A1 1/2017 Liberatore
2017/0036363 A1 2/2017 Efthimiadis et al.
2017/0043492 A1 2/2017 Robertson et al.
2017/0066148 A1 3/2017 Hodgson et al.
2017/0066149 A1 3/2017 Hodgson et al.
2017/0080585 A1 3/2017 Griffin et al.
2017/0112002 A1 4/2017 Behrendt
2017/0173806 A1 6/2017 Lee
2017/0173809 A1 6/2017 Psimadas et al.
2017/0203453 A1 7/2017 Hodgson et al.
2017/0225345 A1 8/2017 Burrowes et al.
2017/0259440 A1 9/2017 Broemse et al.
2017/0266825 A1 9/2017 Bozikis et al.
2017/0274543 A1* 9/2017 Quarantello .......... B26B 21/522
2017/0282390 A1 10/2017 Hodgson
2017/0282391 A1 10/2017 Provost et al.
2017/0282392 A1 10/2017 Maimone et al.
2017/0319310 A1 11/2017 Gengyo et al.
2017/0326741 A1 11/2017 Liberatore
2017/0326743 A1 11/2017 Hodgson
2017/0326744 A1 11/2017 Liberatore
2017/0334083 A1 11/2017 Gratsias et al.
2017/0341248 A1 11/2017 Lee et al.
2017/0341249 A1 11/2017 Lee et al.
2018/0043553 A1 2/2018 Lu et al.
2018/0079095 A1 3/2018 Robertson et al.
2018/0093384 A1 4/2018 Moffat
2018/0141225 A1 5/2018 Zucker
2018/0200899 A1 7/2018 Eagleton et al.
2018/0272549 A1 9/2018 Son et al.
2018/0297222 A1 10/2018 Hodgson
2018/0297224 A1 10/2018 Bozikis et al.
2018/0370052 A1 12/2018 Zaremba et al.
2019/0117356 A1 4/2019 Bärtschi et al.
2019/0152077 A1 5/2019 Kim
2019/0152079 A1 5/2019 Chang
2019/0176355 A1 6/2019 Mazarakis et al.
2019/0224874 A1 7/2019 Blatter et al.
2019/0255721 A1 8/2019 Psimadas et al.
2019/0299440 A1 10/2019 Fontecchio et al.
2019/0299441 A1 10/2019 Mcnally et al.
2019/0299442 A1 10/2019 Mcnally et al.
2019/0299443 A1 10/2019 Bourque et al.
2019/0299444 A1 10/2019 Bassett et al.
2019/0299445 A1 10/2019 Bassett et al.
2019/0299447 A1 10/2019 Johnson et al.
2019/0299448 A1 10/2019 Siegmann et al.
2019/0299449 A1 10/2019 Patel et al.
2019/0299450 A1 10/2019 Johnson et al.

(56) References Cited

U.S. PATENT DOCUMENTS

| | | | |
|---|---|---|---|
| 2019/0299451 | A1 | 10/2019 | Long et al. |
| 2019/0299452 | A1 | 10/2019 | Johnson et al. |
| 2019/0299453 | A1 | 10/2019 | Bourque et al. |
| 2019/0299455 | A1 | 10/2019 | Patel et al. |
| 2019/0299461 | A1 | 10/2019 | Johnson et al. |
| 2019/0299462 | A1 | 10/2019 | Washington et al. |
| 2019/0299463 | A1 | 10/2019 | Patel et al. |
| 2019/0299464 | A1 | 10/2019 | Washington et al. |
| 2019/0299465 | A1 | 10/2019 | Gester et al. |
| 2019/0299467 | A1 | 10/2019 | Bassett et al. |
| 2019/0299468 | A1 | 10/2019 | Bassett et al. |
| 2019/0299469 | A1 | 10/2019 | Bassett et al. |
| 2019/0299470 | A1 | 10/2019 | Verasamy et al. |
| 2019/0299471 | A1 | 10/2019 | Verasamy et al. |
| 2019/0299472 | A1 | 10/2019 | Johnson et al. |
| 2019/0299473 | A1 | 10/2019 | Johnson et al. |
| 2019/0299474 | A1 | 10/2019 | Bourque et al. |
| 2019/0299477 | A1 | 10/2019 | Johnson et al. |
| 2019/0337174 | A1 | 11/2019 | Kopelas et al. |
| 2019/0358836 | A1 | 11/2019 | Maimone et al. |
| 2019/0358837 | A1 | 11/2019 | Broemse et al. |
| 2019/0366570 | A1 | 12/2019 | Kopelas et al. |
| 2020/0023531 | A1 | 1/2020 | Hitchcock |
| 2020/0039098 | A1 | 2/2020 | Kopelas et al. |
| 2020/0130208 | A1 | 4/2020 | Anjum et al. |
| 2020/0130209 | A1 | 4/2020 | Maurer et al. |
| 2020/0180178 | A1 | 6/2020 | Park et al. |
| 2020/0223080 | A1 | 7/2020 | Tucker et al. |
| 2020/0236738 | A1 | 7/2020 | Heubach et al. |
| 2020/0361105 | A1 | 11/2020 | Park et al. |
| 2020/0361106 | A1 | 11/2020 | Broemse |
| 2020/0368927 | A1 | 11/2020 | O'connor et al. |
| 2020/0398449 | A1 | 12/2020 | Claus et al. |
| 2021/0016458 | A1 | 1/2021 | Peterson et al. |
| 2021/0323180 | A1 | 10/2021 | Shen et al. |
| 2021/0323181 | A1 | 10/2021 | Shen et al. |
| 2021/0379780 | A1 | 12/2021 | Patel et al. |
| 2022/0152855 | A1 | 5/2022 | Noh et al. |
| 2022/0241994 | A1 | 8/2022 | Washington |
| 2022/0258366 | A1 | 8/2022 | Johnson et al. |
| 2022/0258367 | A1 | 8/2022 | Johnson et al. |
| 2022/0329246 | A1 | 10/2022 | Von Dahlen et al. |
| 2022/0347875 | A1 | 11/2022 | Hamelin et al. |

FOREIGN PATENT DOCUMENTS

| | | | |
|---|---|---|---|
| CN | 1462103 | A | 12/2003 |
| CN | 2848496 | Y | 12/2006 |
| CN | 200977659 | Y | 11/2007 |
| CN | 101306537 | A | 11/2008 |
| CN | 201253863 | Y | 6/2009 |
| CN | 101612740 | A | 12/2009 |
| CN | 101790444 | A | 7/2010 |
| CN | 102133756 | A | 7/2011 |
| CN | 202085323 | U | 12/2011 |
| CN | 101795832 | B | 7/2012 |
| CN | 103208780 | A | 7/2013 |
| CN | 203031634 | U | 7/2013 |
| CN | 103235614 | A | 8/2013 |
| CN | 203210412 | U | 9/2013 |
| CN | 103909531 | A | 7/2014 |
| CN | 103998190 | A | 8/2014 |
| CN | 203818169 | U | 9/2014 |
| CN | 107107359 | A | 8/2017 |
| CN | 206795896 | U | 12/2017 |
| DE | 575523 | C | 4/1933 |
| DE | 2620813 | A1 | 11/1976 |
| DE | 2520959 | A1 | 12/1976 |
| DE | 2801845 | A1 | 7/1979 |
| DE | 3141361 | A1 | 8/1982 |
| DE | 202009003889 | U1 | 5/2009 |
| DE | 102008032389 | A1 | 1/2010 |
| EP | 0020816 | A1 | 1/1981 |
| EP | 0885697 | A1 | 12/1998 |
| EP | 0903205 | A1 | 3/1999 |
| EP | 0987088 | A1 | 3/2000 |
| EP | 1535708 | A1 | 6/2005 |
| EP | 1671761 | A1 | 6/2006 |
| EP | 1363517 | B1 | 2/2008 |
| EP | 2338652 | A1 | 6/2011 |
| EP | 3166760 | B1 | 3/2018 |
| FR | 520234 | A | 6/1921 |
| FR | 749861 | A | 8/1933 |
| FR | 840502 | A | 4/1939 |
| FR | 985030 | A | 7/1951 |
| FR | 2703290 | A1 | 10/1994 |
| FR | 2716402 | A1 | 8/1995 |
| GB | 875618 | A | 8/1961 |
| GB | 1056038 | A | 1/1967 |
| GB | 1075139 | A | 7/1967 |
| GB | 2030909 | A | 4/1980 |
| GB | 2078589 | A | 1/1982 |
| GB | 2093750 | A | 9/1982 |
| GB | 2116470 | A | 9/1983 |
| GB | 2323224 | A | 9/1998 |
| GB | 2452411 | B | 5/2010 |
| JP | S5566396 | U | 5/1980 |
| JP | S56128188 | A | 10/1981 |
| JP | S5838581 | A | 3/1983 |
| JP | S60194333 | U | 12/1985 |
| JP | H06137960 | A | 5/1994 |
| JP | H06216532 | A | 8/1994 |
| JP | H0720172 | U | 4/1995 |
| JP | H08202459 | A | 8/1996 |
| JP | H10165521 | A | 6/1998 |
| JP | H10207288 | A | 8/1998 |
| JP | H11059591 | A | 3/1999 |
| JP | 3066524 | B2 | 5/2000 |
| JP | 2001510720 | A | 8/2001 |
| JP | 2002023805 | A | 1/2002 |
| JP | 2002066172 | A | 3/2002 |
| JP | 2004186072 | A | 7/2004 |
| JP | 2005246044 | A | 9/2005 |
| JP | 2006520212 | A | 9/2006 |
| JP | 2007068922 | A | 3/2007 |
| JP | 2007512928 | A | 5/2007 |
| JP | 2007525309 | A | 9/2007 |
| JP | 2008059842 | A | 3/2008 |
| JP | 2008063187 | A | 3/2008 |
| JP | 2008515510 | A | 5/2008 |
| JP | 2009506858 | A | 2/2009 |
| JP | 2009178400 | A | 8/2009 |
| JP | 2010124875 | A | 6/2010 |
| JP | 2010193758 | A | 9/2010 |
| JP | 2010532220 | A | 10/2010 |
| JP | 2011019558 | A | 2/2011 |
| JP | 2011152345 | A | 8/2011 |
| JP | 2011523882 | A | 8/2011 |
| JP | 2013523407 | A | 6/2013 |
| JP | 5753310 | B1 | 5/2015 |
| JP | 2015515884 | A | 6/2015 |
| JP | 2015195869 | A | 11/2015 |
| JP | 2016168276 | A | 9/2016 |
| JP | 2017500115 | A | 1/2017 |
| JP | 2017501852 | A | 1/2017 |
| JP | 2017502778 | A | 1/2017 |
| JP | 2017502781 | A | 1/2017 |
| JP | 2017086606 | A | 5/2017 |
| JP | 2017531513 | A | 10/2017 |
| KR | 920000490 | Y1 | 7/1991 |
| KR | 20070089345 | A | 8/2007 |
| KR | 20100108753 | A | 10/2010 |
| KR | 20140040880 | A | 4/2014 |
| KR | 20140042230 | A | 4/2014 |
| KR | 20140069811 | A | 6/2014 |
| KR | 200473990 | Y1 | 8/2014 |
| WO | 9213684 | A2 | 8/1992 |
| WO | 9404106 | A1 | 3/1994 |
| WO | 9708804 | A1 | 3/1997 |
| WO | 9737819 | A2 | 10/1997 |
| WO | 2010078564 | A2 | 7/2010 |
| WO | 2013070995 | A1 | 5/2013 |
| WO | 2015108805 | A1 | 7/2015 |
| WO | 2015108806 | A1 | 7/2015 |

(56) References Cited

FOREIGN PATENT DOCUMENTS

| | | | |
|---|---|---|---|
| WO | 2015108801 | A4 | 9/2015 |
| WO | 2017024156 | A1 | 2/2017 |
| WO | 2019191231 | A1 | 10/2019 |

OTHER PUBLICATIONS

Collins Dictionary, "loop," available on Aug. 19, 2024, at : https://www.collinsdictionary.com/us/dictionary/english/loop.*

Yield, URL Link: https://en.wikipedia.org/wiki/Yield_(engineering)#:-:text=The%20yield%20strength%20or%20yield,material%20begins%20to%20deform%20plastically., dated 2020 ; 1 page.

Merriam-Webster, URL Link: https://www.merriam-webster.com/dictionary/handle; dated 2020; 2 pages.

3B Certified Silicones in 50, 60, and 70 Durometer, Testa, Dominic, available on Sep. 25, 2020 at https://v www .sspi nc.com/si Ii cones that_ work/88/3 B-Certi fied-Si I icones-i n-50-60-and-70-Du rometer/?vsrefdom =adwords&gclid=EAlalQobChMIOYrO_oyF7AIVk-DICh08_QaFEAAYAiAAEgKAnvD_Bw, dated Feb. 27, 2017,1-6 pages.

Amazon product review, Shaving razor handle dated Mar. 23, 2016,2 pages.

Low Compression Set Gaskets—Silicone, Urethane Foam, New England Die Cutting, available on Sep. 25, 2020 athttps://www.nedc.com/low-compression-set-gaskets-silicone-urethane-foam/ dated Mar. 22, 2020, 1-5 pages.

* cited by examiner

SHAVING RAZOR SYSTEM

FIELD OF THE INVENTION

The present invention relates to personal care products and more particularly to wet shaving razors having a flexible electrical bridge.

BACKGROUND OF THE INVENTION

Users of wet-shave razors generally appreciate a feeling of warmth against their skin during shaving. The warmth feels good, resulting in a more comfortable shaving experience. Various attempts have been made to provide a warm feeling during shaving. For example, shaving creams have been formulated to react exothermically upon release from the shaving canister, so that the shaving cream imparts warmth to the skin. Also, various ways of delivering heat through the razor cartridge have also been proposed in the patent literature. It has also been proposed in the patent literature to heat the blades, which may decrease the force required to cut the hair. Additional electronic components may be required to deliver heat to the skin in a safe and reliable manner. Furthermore, electronic components must be small to fit within a consumer appliance, such as a razor. Accordingly, electrical components and fittings are typically very delicate and can break easily. Electricity typically must be delivered from a power source (e.g., a battery) positioned in the handle to a cartridge that pivots relative to the handle. The cartridge should pivot without impacting the electrical connections. However, this can be challenging because the cartridge may need to pivot over a thousand cycles over its lifetime. In addition, the electrical connection between the handle and the cartridge may negatively impact the pivoting forces of the cartridge by providing additional biasing forces.

Accordingly, there is a need to provide a flexible electrical connection between a handle and a cartridge of a shaving razor system that allows for efficient pivoting of the cartridge while also providing a reliable electrical connection.

SUMMARY OF THE INVENTION

The invention features, in general, a simple, shaving razor system having a handle and a shaving razor cartridge mounted to the handle. A flexible electrical bridge has a portion positioned within the handle and extends from the handle to the shaving razor cartridge. The flexible electrical bridge has a loop between the shaving razor cartridge and the handle.

The invention also features, in general, a shaving razor system having a handle and a shaving razor cartridge mounted to the handle. A flexible electrical bridge is positioned partially within the handle. The flexible electrical bridge has a first bend with a concave bottom surface in a neutral position, second bend with a concave bottom surface in the neutral position and a loop with a concave top surface in the neutral position. The loop is between the first bend and the second bend.

The invention also features, in general, a simple, efficient assembly method for a shaving razor by positioning a circuit board within a handle. A first end of a flexible electrical bridge is connected to the circuit board. A second end of the flexible electrical bridge is connected to a heating element. A loop is formed in the flexible electrical bridge by bending the flexible electrical bridge.

The invention also features, in general, a shaving razor system having a handle and a shaving razor cartridge mounted to the handle. The shaving razor cartridge has a primary pivot axis. A flexible electrical bridge having a loop is positioned between the shaving razor cartridge and the handle. The flexible electrical bridge is positioned partially within the handle and partially within the shaving razor cartridge. A cartridge entry point of the flexible electrical bridge is positioned below the primary pivot axis.

The details of one or more embodiments of the invention are set forth in the accompanying drawings and the description below. It is understood that certain embodiments may combine elements or components of the invention, which are disclosed in general, but not expressly exemplified or claimed in combination, unless otherwise stated herein. Other features and advantages of the invention will be apparent from the description and drawings, and from the claims.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings.

DETAILED DESCRIPTION OF THE INVENTION

Figure 1:
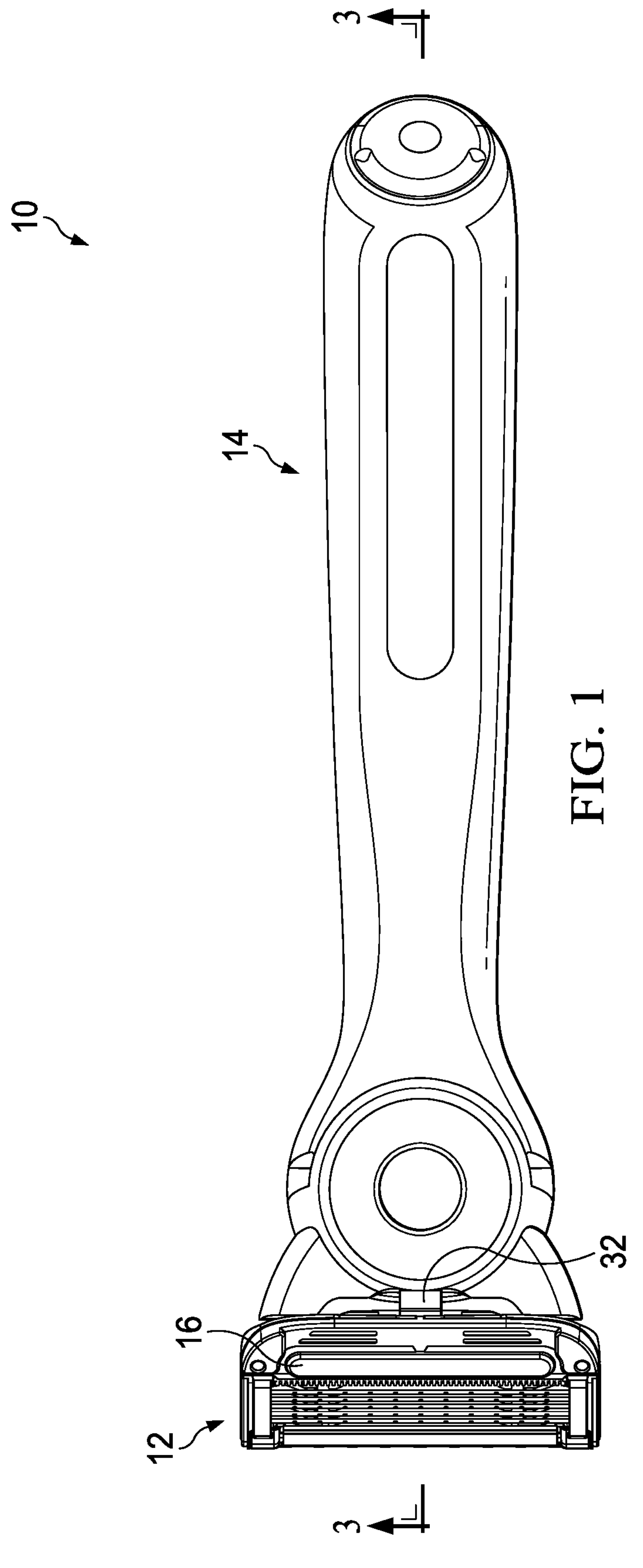
FIG. 1 is a bottom view of one possible embodiment of a shaving razor system.
Figure 2:
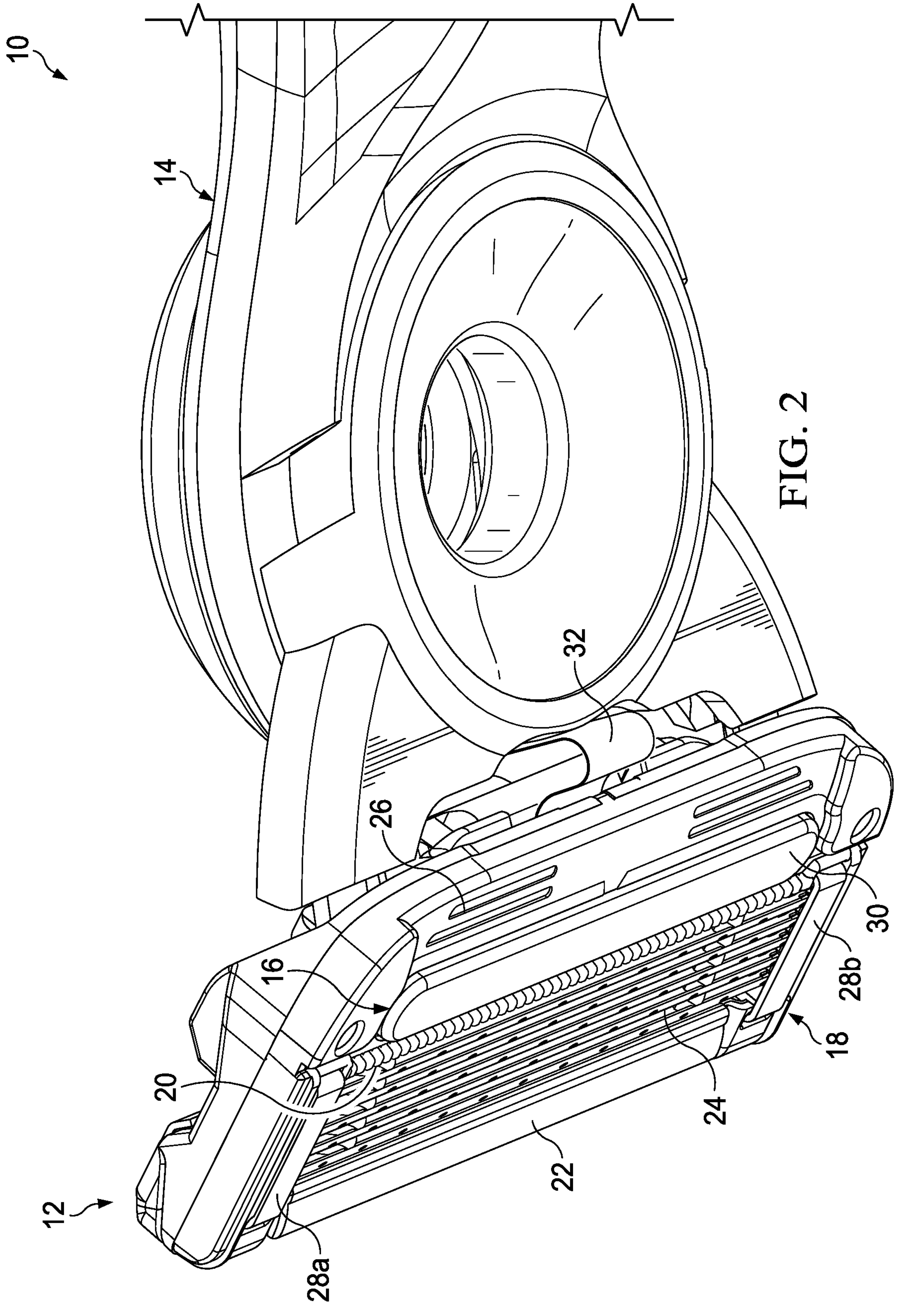
FIG. 2 is an enlarged perspective view of a portion of the shaving razor system of FIG. 1.

Referring to FIGS. 1 and 2, one possible embodiment of the present disclosure is shown illustrating a shaving razor system 10. FIG. 1 is a bottom view of the shaving razor system 10. It is understood that the shaving razor system 10 may also include other electronic personal care products, such as toothbrushes, electric razors, or other products that require an electrical connection. FIG. 2 is an enlarged view of a portion of the shaving razor system 10. In certain embodiments, the shaving razor system 10 may include a shaving razor cartridge 12 mounted to a handle 14. The shaving razor cartridge 12 may be fixedly or pivotably mounted to the handle 14, depending on the overall desired cost and performance of the shaving razor system 10. The handle 14 may hold a power source, such as one or more batteries (not shown) that supplies power to an electrical component 16 such as an energy emitting device, which may include heating elements, light emitting sources, motors and lasers. As will be explained in greater detail below, the electrical component 16 may be in electrical communication with the power source (not shown) via a flexible electrical bridge 32. The flexible electrical bridge 32 may extend from the handle 14 to the shaving razor cartridge 12. A portion of the flexible electrical bridge 32 may be exposed between the handle 14 and the shaving razor cartridge 12 (e.g., not in contact with the handle 14 or the shaving razor cartridge 12).

The shaving razor cartridge 12 may be permanently attached or removably mounted to the handle 14, thus allowing the shaving razor cartridge 12 to be replaced. Referring to FIG. 2, the shaving razor cartridge 12 may have a housing 18 with a guard 20, a cap 22, and one or more blades 24 mounted to the housing 18 between the cap 22 and the guard 20. The guard 20 may be toward a front portion of the housing 18 and the cap 22 may be toward a rear portion of the housing 18 (i.e., the guard 20 is in front of the blades 24 and the cap is behind the blades 24). The guard 20 and the cap 22 may define a shaving plane that is tangent to the guard 20 and the cap 22. The guard 20 may be a solid or segmented bar that extends generally parallel to the blades 24. In certain embodiments, the guard 20 may comprise a skin-engaging member 26 (e.g., a plurality of fins, grooves or an elastomeric pad) in front of the blades 24 for stretching the skin during a shaving stroke. The skin-engaging member 26 may be insert injection molded or co-injection molded to the housing 18. However, other known assembly methods may also be used such as adhesives, ultrasonic welding, or mechanical fasteners. The skin engaging member 26 may be molded from a softer material (i.e., lower durometer hardness) than the housing 18. For example, the skin engaging member 26 may have a Shore A hardness of about 20, 30, or 40 to about 50, 60, or 70. A softer material may enhance skin stretching, as well as provide a more pleasant tactile feel against the skin of the user during shaving. A softer material may also aid in masking the less pleasant feel of the harder material of the housing 18 and/or the fins against the skin of the user during shaving.

In certain embodiments, the blades 24 may be mounted to the housing 18 and secured by one or more clips **28*a* and 28*b*. Other assembly methods known to those skilled in the art may also be used to secure and/or mount the blades 24 to the housing 18 including, but not limited to, wire wrapping, cold forming, hot staking, insert molding, ultrasonic welding, and adhesives. The clips 28*a* and 28*b* may comprise a metal, such as aluminum for acting as a sacrificial anode to help prevent corrosion of the blades 24. Although five blades 24 are shown, the housing 18 may have more or fewer blades depending on the desired performance and cost of the shaving razor cartridge 12**.

Figure 10:
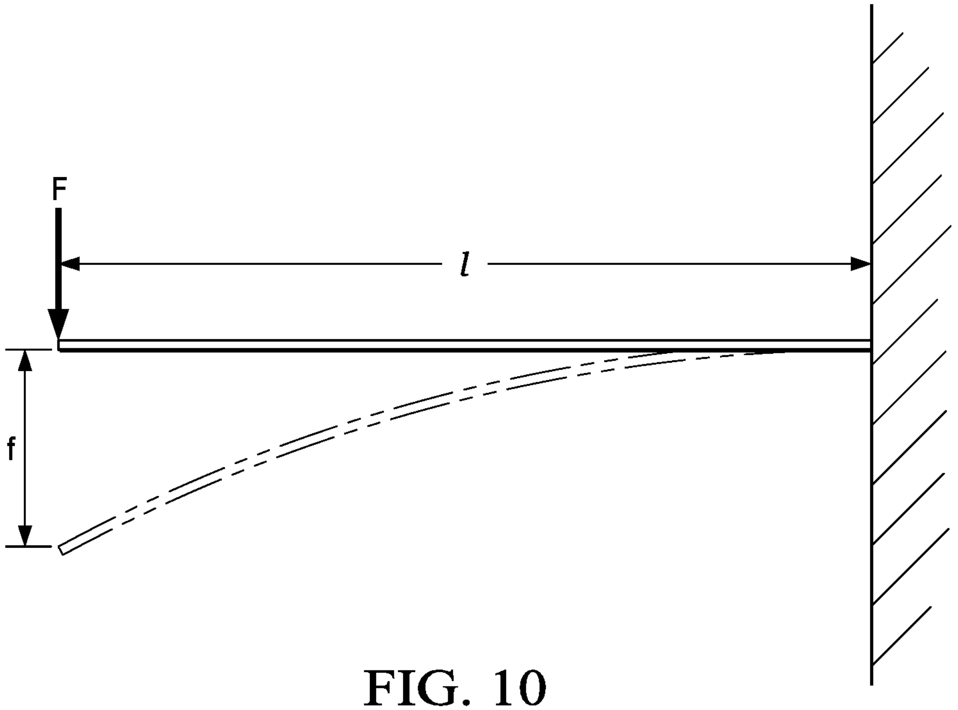
FIG. 10 is a view of a free body diagram.

In certain embodiments, it may be desirable to provide heat in front of the blades 24. For example, the electrical component 16 may be positioned in front of the guard 20 and behind the skin engaging member 26. The electrical component 16 may comprise a skin contacting surface 30 (e.g., a face plate) that delivers heat to a consumer's skin during a shaving stroke for an improved shaving experience. As will be described in greater detail below, the electrical component 16 may be mounted to either the shaving razor cartridge 12 or to a portion of the handle 14. As will be illustrated in greater detail below, the electrical component 16 may be in electrical communication with a power circuit (not shown) via the flexible electrical bridge 32. The flexible electrical bridge 32 may have electrical tracks to transfer electrical signals and current between the handle 14 and the shaving razor cartridge 14. The flexible electrical bridge 32 may extend from the handle 14 to the shaving razor cartridge 12. At least a portion 35 (shown in FIG. 3) of the flexible electrical bridge 32 may be positioned within the shaving razor cartridge 12 and at least a portion 37 positioned within the handle 14. The flexible electrical bridge 32 may have at least one electrical track to transfer electrical current. In certain embodiments, the electrical track may comprise copper. In certain embodiments, the flexible electrical bridge 32 may have a bending stiffness per width of about 0.07 Nmm to about 0.2 Nmm to allow sufficient flexibility of the flexible electrical bridge 32 during assembly. The bending stiffness may be calculated by a one-sided clamped bending beam method as shown below and in FIG. 10.

$$F=S*f,$$

with the bending stiffness $$S=\frac{3*E*I_y}{l^3}$$

F=force
l=length
f=displacement at l
E=modulus of elasticity
$I_y$=moment of Inertia The cap 22 may be a separate molded (e.g., a shaving aid filled reservoir) or extruded component (e.g., an extruded lubrication strip) that is mounted to the housing 18. In certain embodiments, the cap 22 may be a plastic or metal bar to aid in supporting the skin and define the shaving plane. The cap 22 may be molded or extruded from the same material as the housing 18 or may be molded or extruded from a more lubricious shaving aid composite that has one or more water-leachable shaving aid materials to provide increased comfort during shaving. The shaving aid composite may comprise a water-insoluble polymer and a skin-lubricating water-soluble polymer. Suitable water-insoluble polymers which may be used include, but are not limited to, polyethylene, polypropylene, polystyrene, butadiene-styrene copolymer (e.g., medium and high impact polystyrene), polyacetal, acrylonitrile-butadiene-styrene copolymer, ethylene vinyl acetate copolymer and blends such as polypropylene/polystyrene blend, may have a high impact polystyrene (i.e., Polystyrene-butadiene), such as Mobil 4324 (Mobil Corporation).

Figure 3:
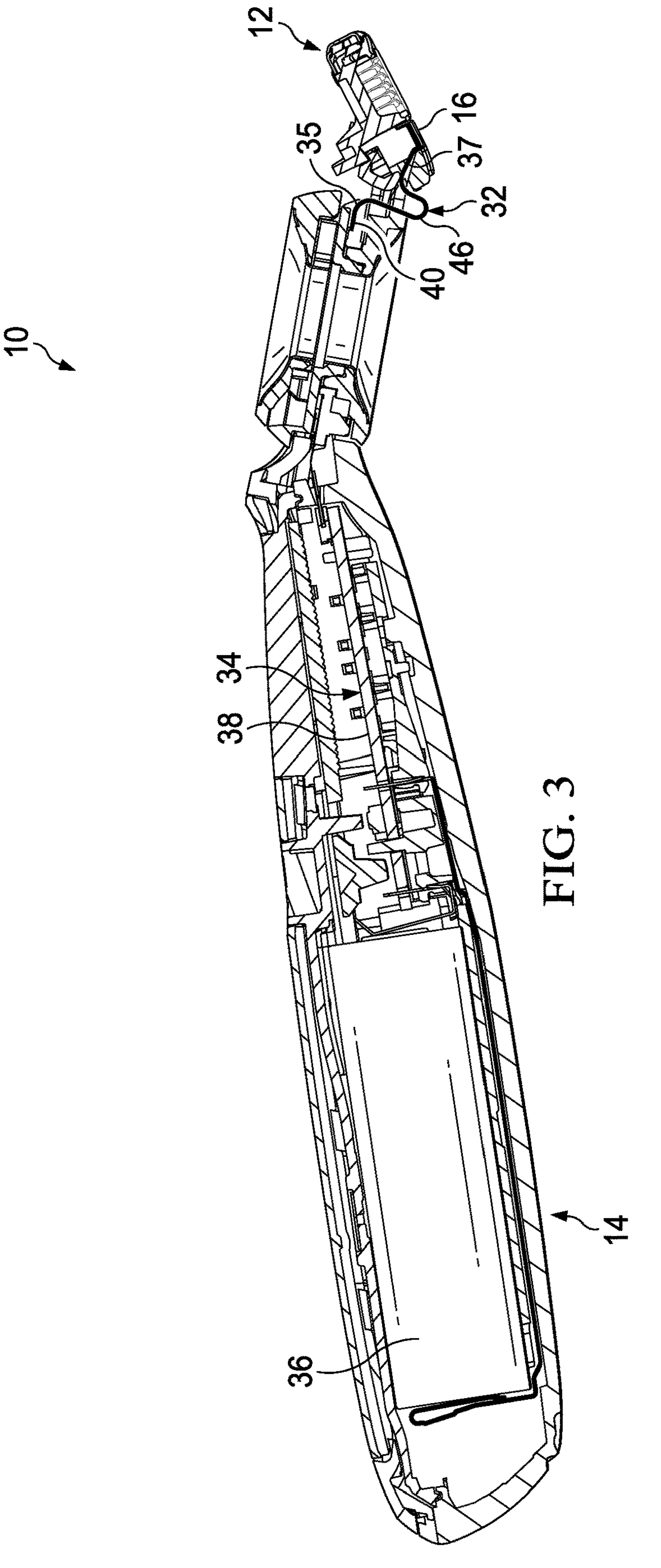
FIG. 3 is a cross section view of the shaving razor system, taken generally along the line 3-3 of FIG. 1.

Referring to FIG. 3, a cross section view of the shaving razor system 10 of FIG. 1 is illustrated. The shaving razor system 10 may include an electrical system 34 having a power source 36 in electrical communication with a circuit board 38 that is in electrical communication with the flexible electrical bridge 32. In certain embodiments, the power source 36 may be a lithium rechargeable battery. The printed circuit board 38 may include a micro-controller (not shown) that controls various operations of the electrical system, such as controlling LEDs or the heat level of the electrical component 16 (see FIG. 2). The flexible electrical bridge 32 may have a portion 35 positioned within the handle 14, a portion 35 positioned within the cartridge 12 and a loop 46 (e.g., a partly open curve within itself) that is positioned outside the handle 14 and the cartridge 12. It is understood that the loop 46 may not cross over itself. The loop 46 may allow the shaving razor cartridge 12 to be positioned on a different plane than a longitudinal axis of the handle 14, thus allowing for an improved shaving angle (e.g., angle of shaving plane relative to longitudinal axis of the handle 14) and pivoting range of the shaving razor cartridge 12 (FIG. 1).

Figure 4A:
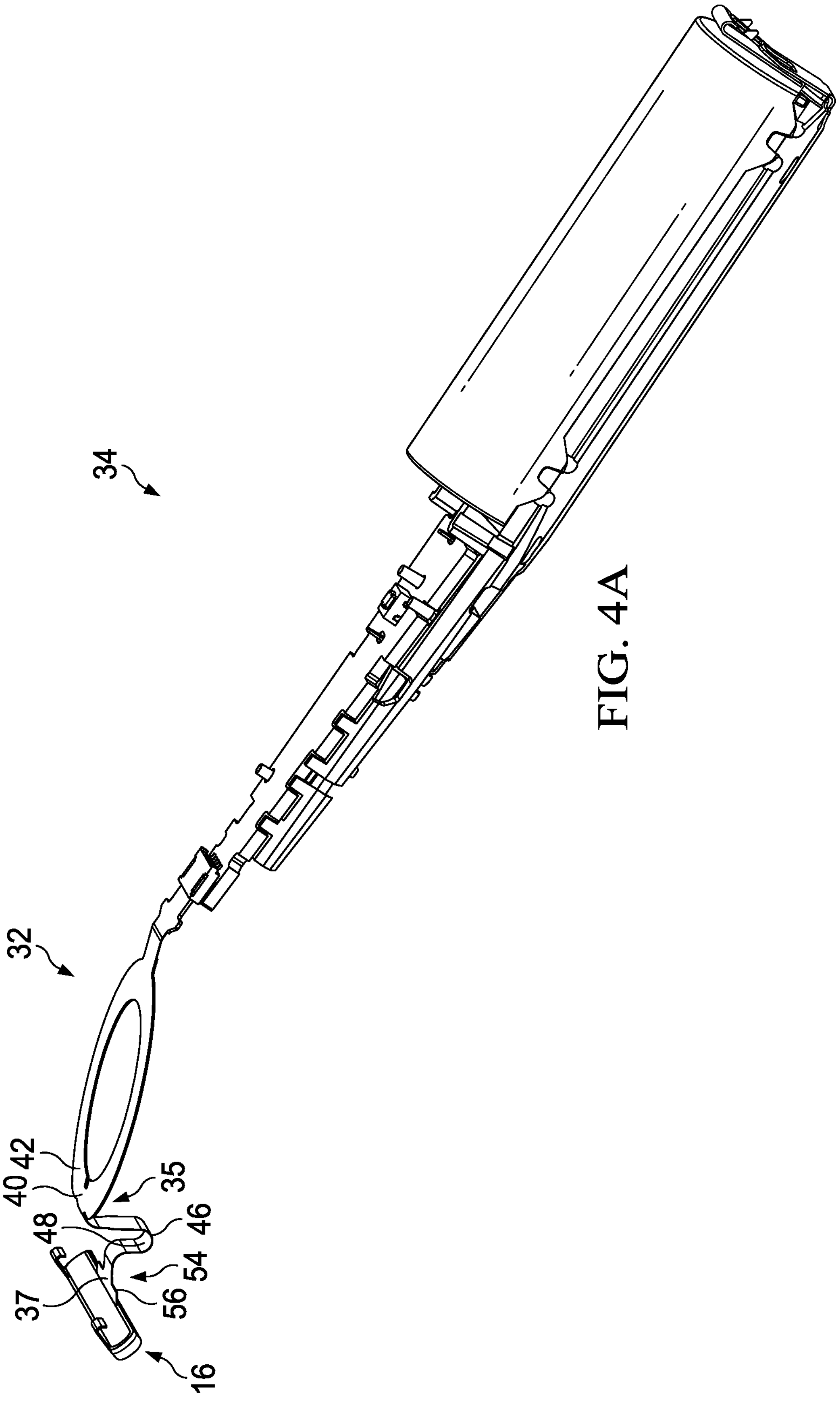
FIG. 4A is a top perspective view of an electrical system that may be incorporated into the shaving razor system of FIG. 1.
Figure 4B:
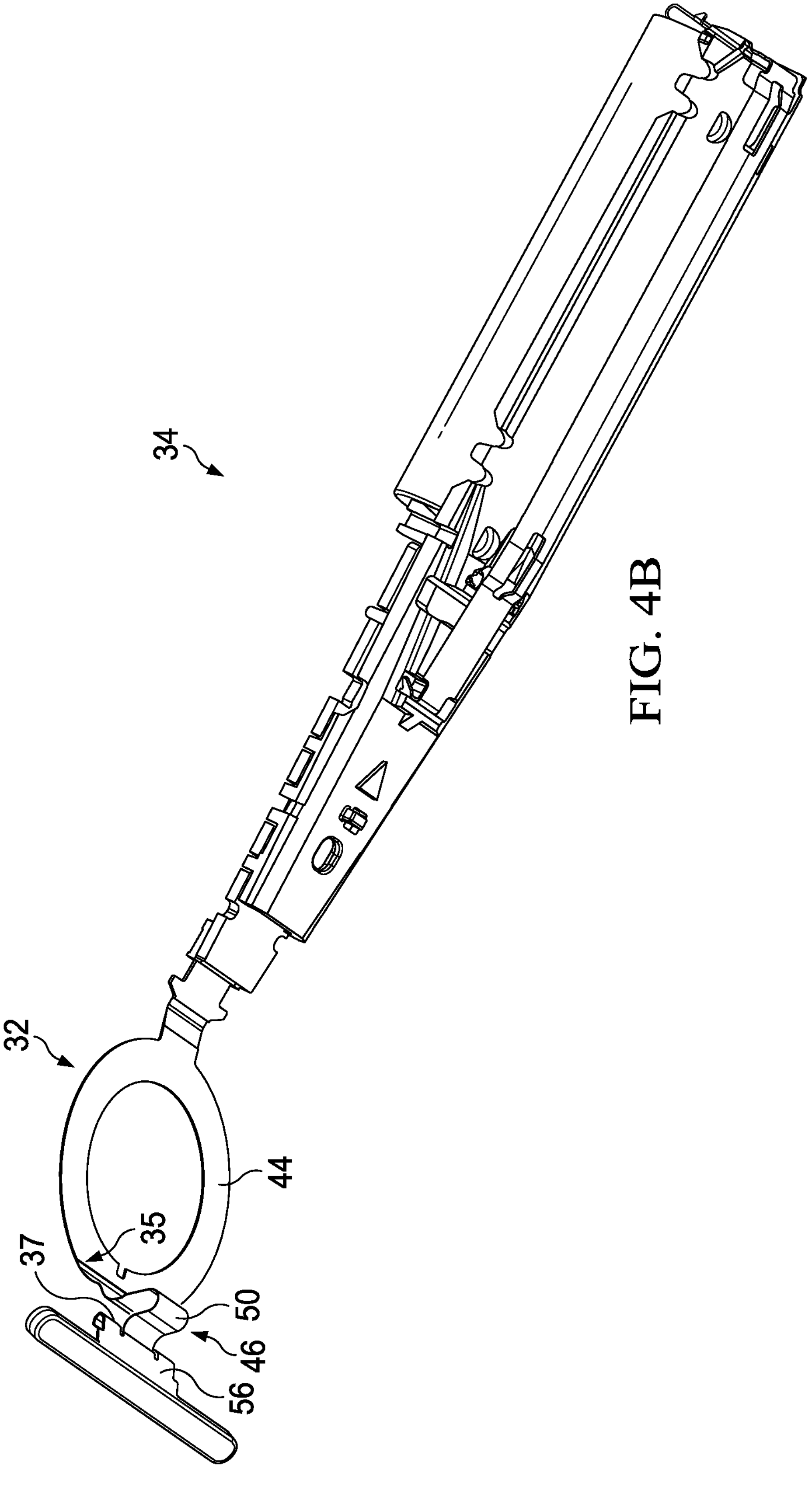
FIG. 4B is a bottom perspective view of the electrical system of FIG. 4A.

Referring to FIGS. 4A and 4B a top perspective view and a bottom perspective view of the electrical system 34 is illustrated. As will be explained in greater detail below, the flexible electrical bridge 32 may have at least one loop having a minimum radius to decrease stresses in the electrical bridge 32 as it is flexed and twisted in different directions. The flexible electrical bridge 32 may have a generally flat portion 40 (i.e., portion 35 positioned within the handle 14) with a top surface 42 and a bottom surface 44. The generally flat portion 40 may extend to a loop 46 that is positioned outside of the handle 14 and spaced apart from the shaving razor cartridge 12, as shown in FIG. 3. As will be described in greater detail below, the loop 46 may be formed during an assembly of the handle 14 (FIG. 1). The loop 46 may have a concave top surface 48 and a convex bottom surface 50. For example, the convex bottom 50 surface may face generally the same direction as the blades 24. However, it is understood the top surface 48 may be convex or concave depending on the positioning of the shaving razor cartridge 12 relative to the handle 14. The portion 35 positioned within the handle 14 (FIG. 1) may be connected to the electrical component 16. For example, the portion 35 may be mounted to a plate 56 on the electrical component 16. The plate 56 may comprise a metal such as aluminum or steel to stiffen the second end for providing a more secure attachment of the flexible electrical bridge 32 to the electrical component 16. In certain embodiments, an overall length of the flexible electrical bridge 32 may be about 5% to about 20% longer in a pre-assembled state compared to an assembled state having the loop 46. The loop 46 may provide for sufficient slack of the flexible electrical bridge 32 to accommodate manufacturing tolerances and excessive pivoting or rotation of the shaving razor cartridge 12 relative to the handle 14.

Figure 5:
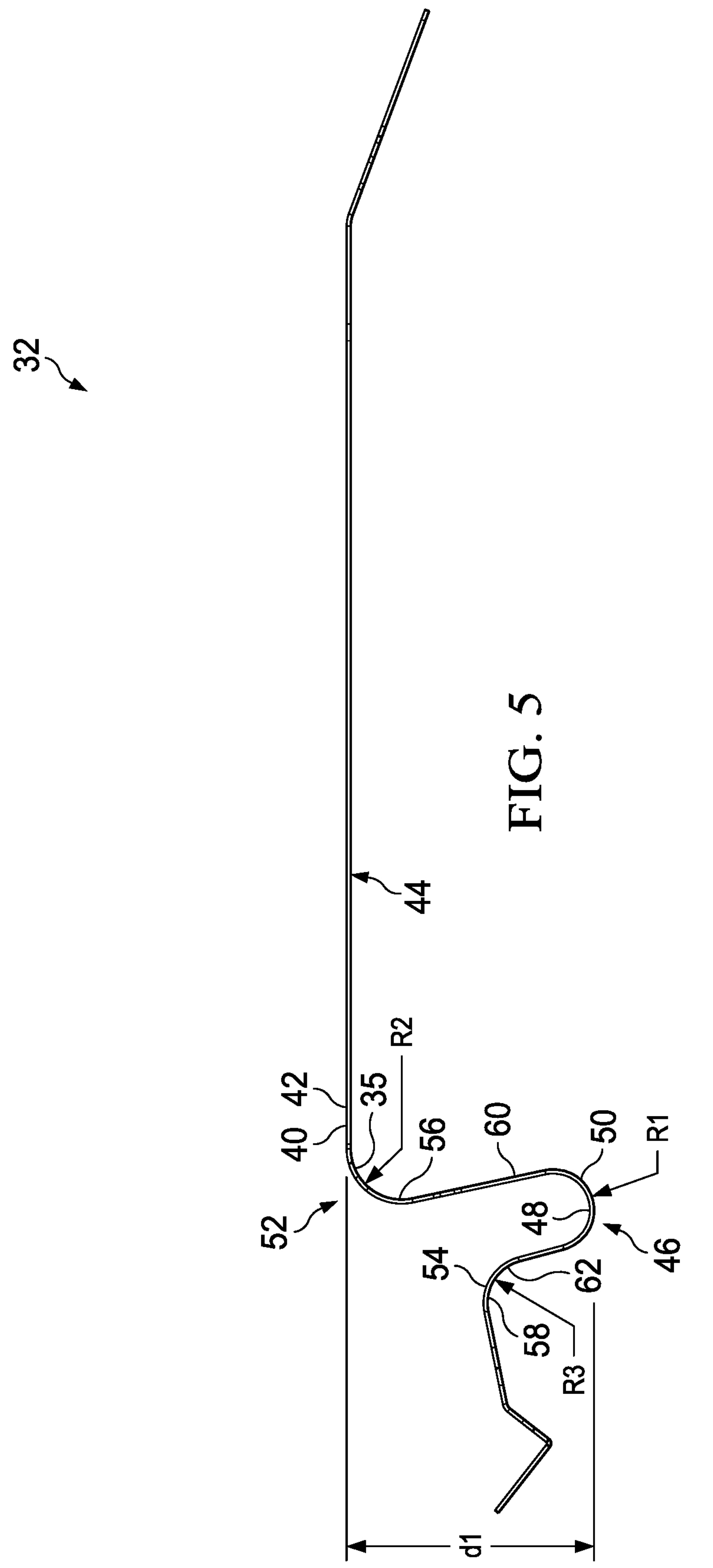
FIG. 5 is a side view of the flexible electrical bridge of FIG. 4A.

Referring to FIG. 5, a side view of the flexible electrical bridge 32 is shown. In certain embodiments, the loop 46 may have a total thickness that is less than a thickness of the generally flat portion 40 (i.e., the portion 37 positioned within the handle 14). For example, the thickness of the loop 46 may be about 0.05 mm to about 0.1 mm and the thickness of the portion 37 positioned with the handle 14 may be about 0.1 mm to about 0.3 mm. The flexible electrical bridge 32 may comprise at least one or more layers of polyimide, adhesive and copper. The loop 46 may be thinner to allow for greater flexibility. The generally flat portion 40 may not need to be as flexible because it is positioned within the handle and may be subject to lower stresses. The bottom surface 50 of the loop 46 may have a radius R1 greater than 1 mm. For example, R1 may be about 1 mm to about 10 mm depending on the rotation or pivoting of the shaving razor cartridge 12 (FIG. 1). It is understood that the shaving razor cartridge 12 may pivot or rotate in more than one direction relative to the handle 14 (FIG. 1). Accordingly, the flexible electrical bridge 32 may bend, twist or both either independently or at the same time. Significant amounts of stress may be applied to the flexible electrical bridge as the cartridge pivots and rotates. The loop 46 may have a first position and a second position. The first position may be a neutral or rest position of the loop 46. The second position may be a flexed position (e.g., when the shaving razor cartridge 12 pivots relative to the handle 14) in which the radius R1 increases or decreases relative to the first position depending on the pivot or rotation of the cartridge. In certain embodiments, the radius R1 may be about 1 mm to about 5 mm in the first position and about 1.5 mm to about 7 mm in the second position.

The flexible electrical bridge 32 may have a first bend 52 in a neutral position with a radius "R2" and a second bend 54 in a neutral position (as shown) with a radius "R3". The loop 46 may be positioned between the first bend 52 and the second bend 54. The first bend 52 may have a bottom surface 56 that is concave in the neutral position. It is understood that during pivoting of the shaving razor cartridge 12, the first bend 52 may become straight or convex. In certain embodiments, the radius R2 may be greater than 1 mm. For example, R2 may be about 1 mm to about 10 mm depending on the rotation or pivoting of the shaving razor cartridge 12 (FIG. 1). The first bend 52 may have a first position and a second position. The first position may be a neutral or rest position of the first bend 52. The second position may be a flexed position in which the radius R2 increases or decreases relative to the first position depending on the pivot or rotation of the shaving razor cartridge 12 (FIG. 1). In certain embodiments, the radius R2 may be about 1 mm to about 5 mm in the first position and about 1.5 mm to about 10 mm in the second position. The second bend 54 may have a bottom surface 58 that is concave in the neutral position. It is understood that during pivoting of the shaving razor cartridge 12, the second bend 54 may become straight or convex. In certain embodiments, the radius R3 may be greater than 1 mm. For example, R3 may be about 1 mm to about 10 mm depending on the rotation or pivoting of the shaving razor cartridge 12 (FIG. 1). The second bend 54 may have a first position and a second position. The first position may be a static or rest position of the second bend 54. The second position may be a flexed position in which the radius R3 increases or decreases relative to the first position depending on the pivot or rotation of the shaving razor cartridge 12 (FIG. 1). In certain embodiments, the radius R3 may be about 1 mm to about 5 mm in the first position and about 1.5 mm to about 10 mm in the second position. However, the radius R3 may also be straight or convex in the second position depending on how much the cartridge 12 is pivoted. In certain embodiments, R1 may be less than R2 and R3.

The flexible electrical bridge 32 may have a first leg 60 between the first bend 52 and the loop 46. A second leg 62 may be positioned between the second bend 54 and the loop 46. The first leg 60 and the second leg 62 may be generally straight. In certain embodiments, the first leg 60 may be longer than the second leg 62 to facilitate proper positioning of flexible electrical bridge 32 relative to the shaving razor cartridge 12 (FIG. 1). The first leg 60 and the second leg 62 may give the loop 46 a generally "U" shape profile.

In addition, the entrance of the flexible electrical bridge to the shaving razor cartridge 12 does not need to be on the same plane as a pivot axis of the shaving razor cartridge. Accordingly, the loop 46 allows for increased design flexibility for the location of the pivot axis without negatively impacting the performance of the flexible electrical bridge 32. The longitudinal axis of the handle 14 may extend generally along the bottom surface 44 of the generally flat portion 40 the flexible electrical bridge 32. The top surface 48 of the loop 46 may be positioned a vertical distance "d1" below the bottom surface 44 of the generally flat portion 40 of the flexible electrical bridge 32. The loop 46 may not significantly impact biasing forces of the shaving razor cartridge 12 as it pivots relative to the handle 14 (e.g., compared to a straight flexible electrical bridge). In certain embodiments, d1 may be about 5 mm to about 10 mm.

Figure 6:
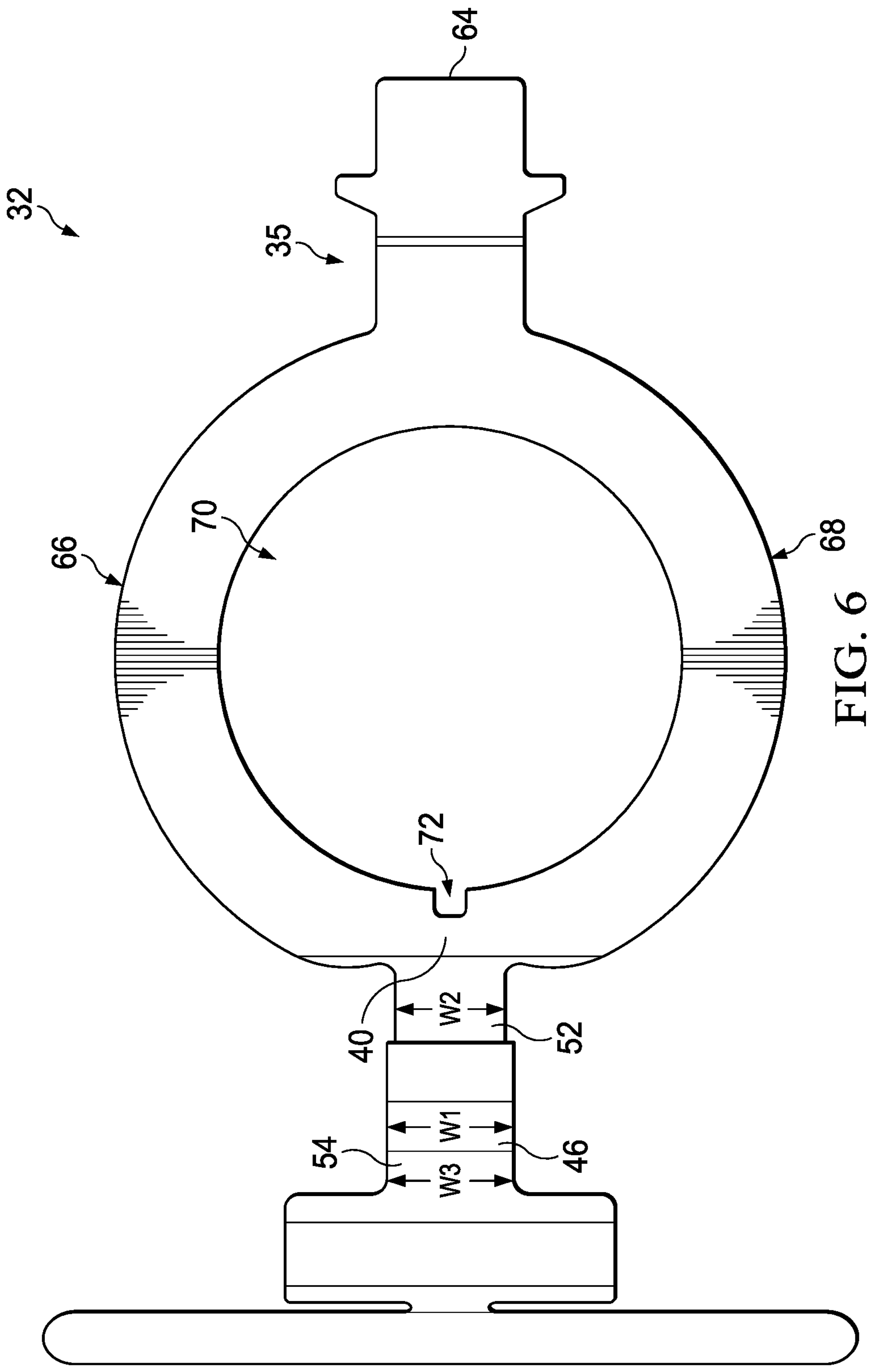
FIG. 6 is a top view of a flexible electrical bridge that may be incorporated into the electrical system of FIG. 4.

Referring to FIG. 6, a top view of the flexible electrical bridge 32 is shown. An electrical connector 64 may be positioned at an end of the flexible electrical bridge 32. The electrical connector 64 may connect the flexible electrical bridge 32 to the circuit board 38 (FIG. 3). In certain embodiments, the flexible electrical bridge 32 may be bifurcated. For example, the first bend 52 may extend in a first direction toward the loop 46 and in another direction to a pair of spaced apart arms 66 and 68 that extend around an opening 70 and merge back together before the electrical connector 64. The flexible electrical bridge 32 may have a notch 72 configured to engage a corresponding portion of the handle 14, such as a post 75 (see FIG. 7) to properly locate the flexible electrical bridge 32 during assembly. The loop 46 may have a first width "w1" of about 3 mm to about 6 mm and more preferably about 4 mm to about 5 mm. The first bend 52 may have a width "w2" that is less than w1. For example, w2 may be about 3 mm to about 4 mm. In certain embodiments, the first bend 52 may form a neck (e.g., have a smaller width in the middle than at either end). For example, the width "w2" of the first bend 52 may be less than the width "w1" at one end of the first bend 52 and less than a width at another end of the first bend 52 toward the arms 66 and 68. In certain embodiments, the first bend 52 of the flexible electrical bridge 32 may have a smaller width than the loop 46 to better accommodate stresses associated with bending and twisting of the flexible electrical bridge 32. The second bend 54 may have a width "w3" that is the same as "w1".

Flexible electrical bridges are commonly used to connect electrical components in electrical devices that are not on the same printed circuit board (e.g., placed in different locations of the electrical device). In such applications, the flexible electrical bridge may be static, and flexibility may only be required to accommodate different locations in space, but not relative movement of the connected electrical components. In other devices, such as ink jet printers, one component (e.g., the print head) may move in a linear motion relative to a second fixed electrical component (e.g., a printed circuit board). Accordingly, the flexible electrical bridge may change shape from being flat to U shaped to accommodate changes in distance as components move in a linear direction. Shaving razor cartridges typically pivot relative to a handle (e.g., FIG. 1) in a non-linear fashion. The flexible electrical bridge 32 flexes to change distance on a circular path, which may be accomplished by reducing and increasing one or more radii of the flexible electrical bridge 32 (e.g., a radius of the loop 46). If the loop 46 was straight, the pivoting of the cartridge 12 relative to the handle 14 may cause increased and uncontrolled stress on the flexible electrical bridge 32. The added stress may result in breaking any electrical connections on the flexible electrical bridge 32.

Figure 7:
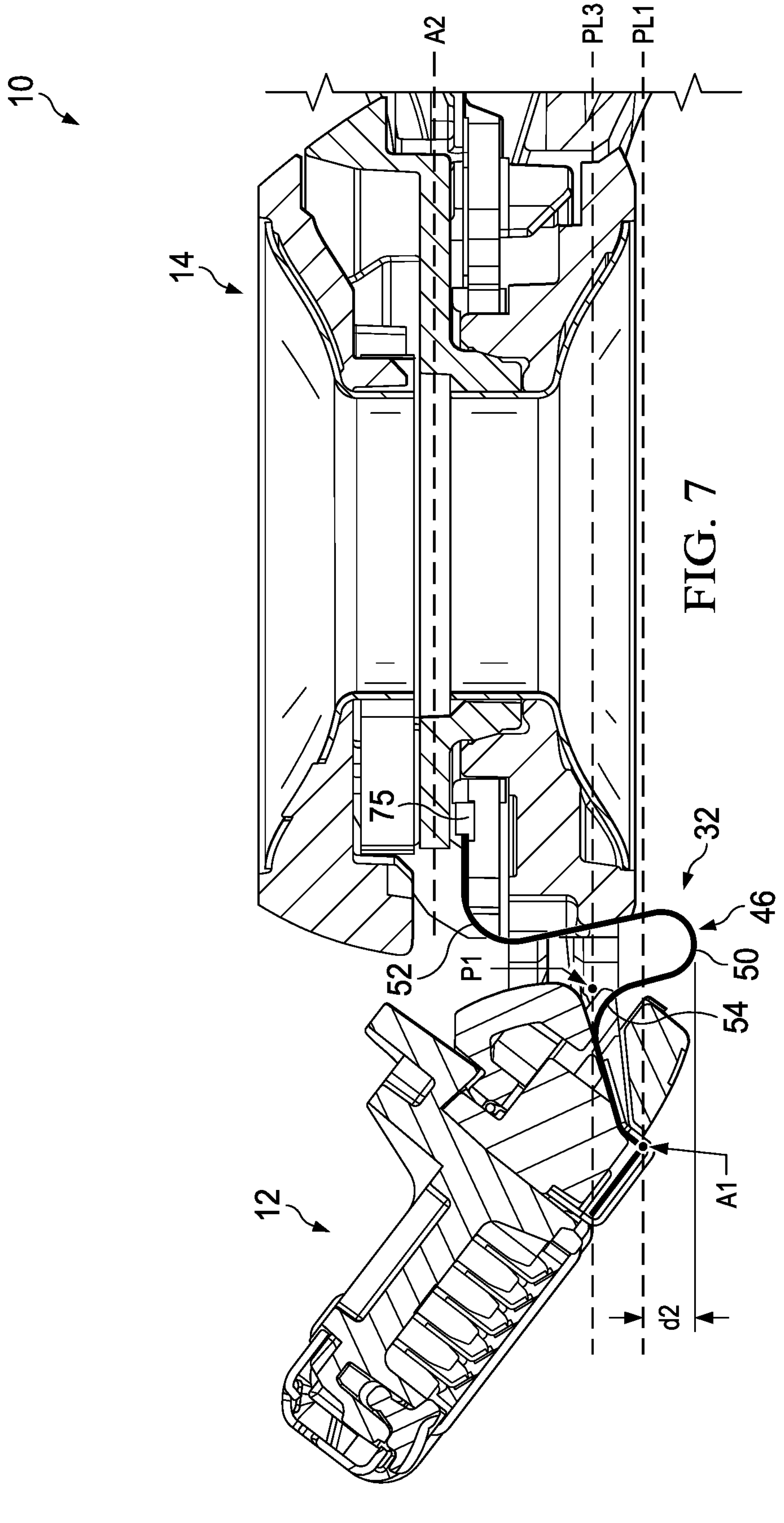
FIG. 7 is an enlarged partial view of FIG. 3.

Referring to FIG. 7 an enlarged partial cross section view of the shaving razor system 10 is illustrated. In certain embodiments, the shaving razor system 10 may allow for the shaving razor cartridge 12 to pivot (relative to the handle 14) about more than one axis. For example, the shaving razor system 10 may have a primary pivot axis A1 (e.g., extending into the page) about which the shaving razor cartridge 12 pivots. The primary pivot axis A1 may be transverse to a secondary pivot axis A2. In certain embodiments, a plane PL1 may extend through the primary pivot axis A1 and may be parallel to the secondary pivot axis A2. More modern shaving razors may have more than one pivot axis to improve contact with the skin, especially for shaving contoured areas of the face and body. However, multiple pivot points may add significant stress to electrical connections between the handle and the cartridge. Electrical connections may also be subjected to increased stress if a connection point at the cartridge is not aligned with the electrical connection. For example, the flexible electrical bridge 32 may enter the shaving razor cartridge 12 at a point P1 that lies on a plane PL3. The plane PL3 may be parallel to PL1 and offset from PL1. Accordingly, the point P1 may not lie on the same plane as the primary pivot axis A1 (e.g., P1 may lie on the flexible electrical bridge 32). The loop 46 may aid in decreasing stress on the flexible electrical bridge 32 in both a static and dynamic positions of the shaving razor cartridge 12. Accordingly, the flexible electrical bridge 32 may withstand thousands of cycles of the shaving razor cartridge 12 pivoting relative to the handle 10 without failure or damage to any electrical connections on the flexible electrical bridge 32. The bottom surface 50 of the loop 46 may be spaced apart from the plane PL1 of the primary pivot axis A1 by a vertical distance "d2" of about 0.5 mm to about 2.0 mm. The first and second bends 52 and 54 may also contribute to decreasing the stress on the flexible electrical bridge 32 by providing a more forgiving assembly. The loop 46 allows more flexibility in a vertical position compared to a straight section of the flexible electrical bridge 32.

Figure 8:
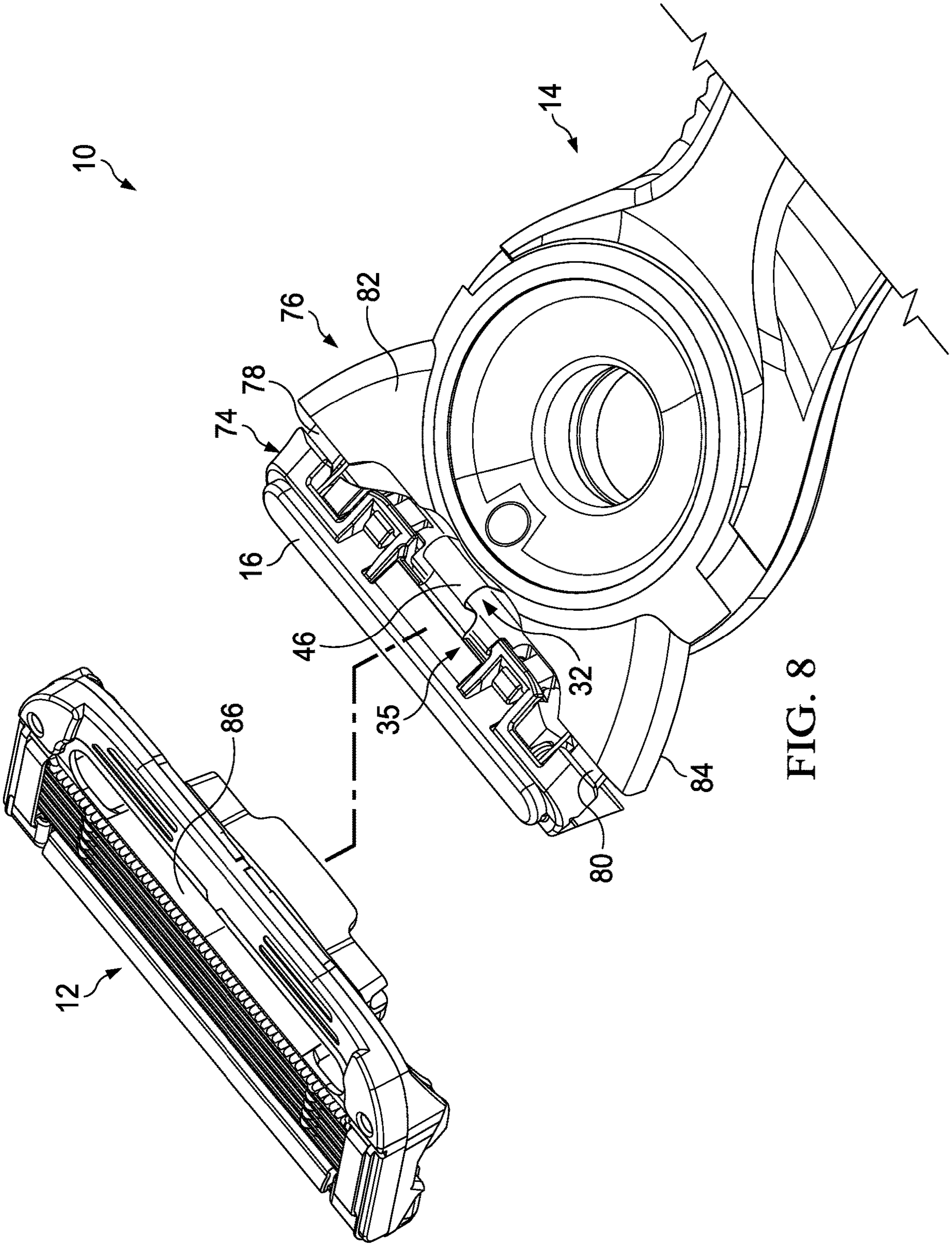
FIG. 8 is a perspective assembly view of the shaving razor system.

Referring to FIG. 8, an enlarged partial perspective view of the shaving razor system 10 is shown. In certain embodiments, the shaving razor cartridge 12 may be removable from a cartridge connector 74. The cartridge connector 74 may attach to a proximal end 76 of the handle 14. For example, a pair of arms 78 and 80 on the cartridge connector 74 may engage a corresponding arm 82 and 84 of the handle 14. In certain embodiments, the cartridge connector 74 may pivot relative to the handle 14. Accordingly, when the cartridge 12 is mounted to the cartridge connector 74, the cartridge 12 may pivot along with the cartridge connector 74. The energy emitting device 16 may be received within an opening 86 in the shaving razor cartridge 12. As shown in FIG. 8, the flexible electrical bridge 32 may still have the loop 46 when the shaving razor cartridge 12 is disconnected from the handle 14 (e.g., cartridge connector 74). The portion 35 of the flexible electrical bridge 32 may be positioned within the shaving razor cartridge 12 when the shaving razor cartridge 12 is mounted to the handle 14 (e.g., cartridge connector 74).

Figure 9A:
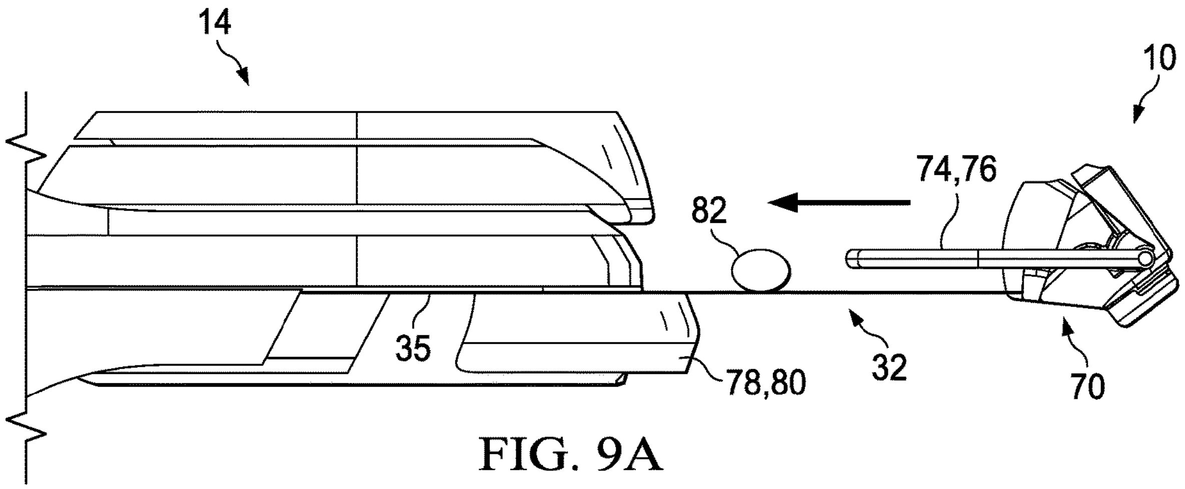
FIG. 9A is a partial side assembly view of a portion of the shaving razor system.
Figure 9B:
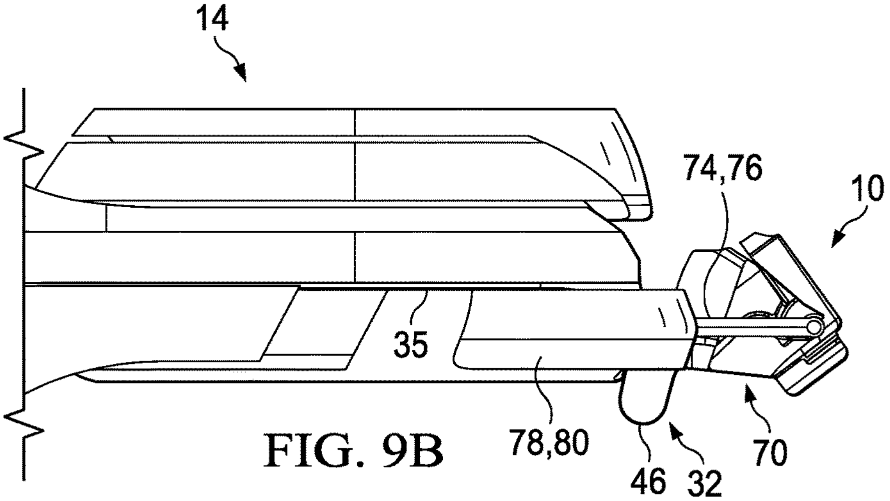
FIG. 9B is a partial side view of the shaving razor system.

Referring to FIGS. 9A and 9B, side views of the shaving razor system 10 are shown in one possible unassembled and one possible assembled position, respectively. In certain embodiments, the flexible electrical bridge 32 may be fixed to the handle 14, such that at least the portion 37 of the flexible electrical bridge 32 is positioned within the handle 14. The flexible electric bridge 32 may then be fixed to the cartridge connector 74. The flexible electrical bridge 32 may be generally straight prior to the cartridge connector 74 being mounted to the handle 14. However, the flexible electrical connector 32 may bend and the loop 46 may be formed when the cartridge connector 74 is mounted and fixed to the handle 14, as shown in FIG. 9B. The cartridge connector 74 may be moved toward the handle 14, as indicated by the arrow in FIG. 9A. The arms 78 and 80 of the handle 14 may be configured to receive and fix in place the corresponding arms 74, 76 of the cartridge connector 74. A fixture 82 may contact and apply force against the flexible electrical bridge 32 to bend the flexible electrical bridge 32 so the loop 46 is formed in the proper direction. Once the cartridge connector 74 is mounted to the handle 14, the loop 46 may be permanent and the fixture 82 may be removed.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing a handle for a shaving razor comprising: positioning a circuit board within a handle; connecting a cartridge to the handle; connecting a first end of a flexible electrical bridge to the circuit board; connecting a second end of the flexible electrical bridge to an energy emitting device; and forming a loop, in a resting position, having a radius of 1 mm to 10 mm in the flexible electrical bridge by bending the flexible electrical bridge; and positioning the loop between the shaving razor cartridge and the handle, and wherein the loop is positioned outside the handle and the shaving razor cartridge.

2. The method of claim 1, further comprising exposing a portion of the flexible electrical bridge between the handle and the shaving razor cartridge such that the portion of the flexible electrical bridge is not in contact with the handle and the shaving razor cartridge.

3. The method of claim 1, further comprising:

forming a first bend in the flexible electrical bridge; and forming a second bend in the flexible electrical bridge;

wherein the loop is formed in the flexible electrical bridge between the first bend and the second bend.

4. A shaving razor system comprising: a handle; a shaving razor cartridge mounted to the handle, the shaving razor cartridge having a primary pivot point positioned on a first plane that intersects a housing of the shaving razor cartridge; and a flexible electrical bridge having a loop, in a resting position, positioned between the shaving razor cartridge and the handle, the flexible electrical bridge positioned partially within the handle and partially within the shaving razor cartridge, wherein a cartridge entry point of the flexible electrical bridge is positioned on a second plane and wherein the first plane is positioned between the second plane and the loop.

5. The shaving razor system of claim 4 wherein a bottom surface of the loop is spaced apart from the first plane.

6. The shaving razor system of claim 5 wherein the bottom surface of the loop is spaced apart from the first plane a vertical distance of 0.5 mm to 2.0 mm.

7. The shaving razor system of claim 4 wherein the cartridge entry point of the flexible electrical bridge is positioned between a bottom surface of the loop and the primary pivot axis.

8. The shaving razor system of claim 7 wherein the primary pivot axis is located between a bottom surface of the loop and a portion of the flexible electrical bridge positioned within the handle.

9. The shaving razor system of claim 4, wherein a portion of the flexible electrical bridge is exposed between the handle and the shaving razor cartridge such that the portion of the flexible electrical bridge is not in contact with the handle and the shaving razor cartridge.

10. The shaving razor system of claim 4, wherein the loop is positioned outside the handle and outside the shaving razor cartridge.

11. The shaving razor system of claim 4, wherein the loop is positioned outside the handle and the shaving razor cartridge.

12. The shaving razor system of claim 4, wherein the loop comprises a concave top surface and a convex bottom surface, wherein the convex bottom surface faces generally a same direction of a plurality of blades of the shaving razor cartridge.

13. The shaving razor system of claim 4, wherein the loop comprises a concave top surface and a convex bottom surface, wherein the convex bottom surface faces generally a same direction of a plurality of blades of the shaving razor cartridge.

14. The shaving razor system of claim 4, wherein the flexible electrical bridge further comprises:

a first bend formed in the flexible electrical bridge; and a second bend formed in the flexible electrical bridge;

wherein the loop is formed in the flexible electrical bridge between the first bend and the second bend.

* * * * *